United States Patent
Lin et al.

(10) Patent No.: US 10,264,576 B2
(45) Date of Patent: Apr. 16, 2019

(54) METHOD FOR UPLINK DATA TRANSMISSION, TERMINAL, AND WIRELESS COMMUNICATION NODE

(71) Applicant: HUAWEI TECHNOLOGIES CO., LTD., Shenzhen (CN)

(72) Inventors: Bo Lin, Beijing (CN); Chao Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 476 days.

(21) Appl. No.: 14/985,573

(22) Filed: Dec. 31, 2015

(65) Prior Publication Data

US 2016/0113000 A1 Apr. 21, 2016

Related U.S. Application Data

(63) Continuation of application No. PCT/CN2013/078587, filed on Jul. 1, 2013.

(51) Int. Cl.
*H04W 72/00* (2009.01)
*H04W 72/04* (2009.01)
(Continued)

(52) U.S. Cl.
CPC ........ *H04W 72/044* (2013.01); *H04L 1/0077* (2013.01); *H04L 1/1825* (2013.01); *H04L 1/1887* (2013.01); *H04W 24/10* (2013.01)

(58) Field of Classification Search
CPC .. H04W 72/044; H04W 24/10; H04L 1/1887; H04L 1/0077; H04L 1/1825
See application file for complete search history.

(56) References Cited

U.S. PATENT DOCUMENTS 9,119,097 B2 * 8/2015 Chatterjee ............. H04W 28/02
9,144,066 B2 * 9/2015 Vos ....................... H04W 72/042
(Continued)

FOREIGN PATENT DOCUMENTS

CN 101635987 A 1/2010
CN 102714580 A 10/2012
(Continued)

OTHER PUBLICATIONS

International Search Report dated Mar. 24, 2014, in corresponding International Application No. PCT/CN2013/078587.
(Continued)

*Primary Examiner* — Lan-Huong Truong
(74) *Attorney, Agent, or Firm* — Staas & Halsey LLP

(57) ABSTRACT

Embodiments of the present invention relate to the communications field, and disclose a method for uplink data transmission, a terminal, and a wireless communication node, which can ensure that a HARQ mechanism between a terminal and a wireless communication node works normally. The method includes: determining, by a first wireless communication node, whether a terminal is within downlink coverage of a second wireless communication node; and when the first wireless communication node determines that the terminal is not within the downlink coverage of the second wireless communication node, instructing, by the first wireless communication node, the terminal to use a non-feedback mode; and/or instructing, by the first wireless communication node, the second wireless communication node to use a non-feedback mode.

11 Claims, 12 Drawing Sheets

---

301 — A terminal sends a measurement report of a downlink reference signal of at least one cell to a first wireless communication node 302 — When the measurement report includes an identifier of the at least one cell, and the identifier of the at least one cell does not include an identifier of a cell served by a second wireless communication node, the terminal receives instruction information that is sent by the first wireless communication node and used to instruct to use a non-feedback mode 303 — The terminal uses the non-feedback mode to perform uplink data transmission

(51) Int. Cl.
*H04L 1/18* (2006.01)
*H04W 24/10* (2009.01)
*H04L 1/00* (2006.01)

(56) References Cited

U.S. PATENT DOCUMENTS

| | | | |
|---|---|---|---|
| 2004/0157610 A1* | 8/2004 | Black | H04W 36/30 |
| | | | 455/443 |
| 2011/0110262 A1 | 5/2011 | Yu et al. | |
| 2011/0305213 A1* | 12/2011 | Lohr | H04L 1/1887 |
| | | | 370/329 |
| 2012/0122472 A1* | 5/2012 | Krishnamurthy | H04L 5/0053 |
| | | | 455/456.1 |
| 2012/0257568 A1 | 10/2012 | Cai et al. | |
| 2012/0329400 A1* | 12/2012 | Seo | H04J 11/005 |
| | | | 455/63.1 |
| 2013/0223400 A1* | 8/2013 | Seo | H04J 11/005 |
| | | | 370/329 |
| 2013/0242855 A1* | 9/2013 | Kim | H04J 11/005 |
| | | | 370/315 |
| 2013/0343239 A1* | 12/2013 | Damnjanovic | H04L 5/001 |
| | | | 370/280 |
| 2014/0126553 A1* | 5/2014 | Li | H04L 5/0055 |
| | | | 370/336 |
| 2014/0226541 A1* | 8/2014 | Xu | H04W 56/0015 |
| | | | 370/280 |
| 2014/0254542 A1 | 9/2014 | Liu et al. | |
| 2015/0223236 A1 | 8/2015 | Ko et al. | |

FOREIGN PATENT DOCUMENTS

| | | | | |
|---|---|---|---|---|
| CN | 103107872 A | | 5/2013 | |
| WO | WO-2012026854 A1 | * | 3/2012 | H04B 7/022 |

OTHER PUBLICATIONS

International Search Report dated Mar. 27, 2014 in corresponding International Patent Application No. PCT/CN2013/078587.
Extended European Search Report dated May 25, 2016 in corresponding European Patent Application No. 13888699.9.
"Discussion on dual connectivity", 3GPP TSG RAN WG1 Meeting #72bis, Apr. 15-19, 2013, Chicago, US, R1-131138, 4 pages.
"Further discussions on UL/DL split", 3GPP TSG-RAN WG2 #82, May 20-24, 2013, Fukuoka, Japan, R2-131678, 6 pages.
"Overview of UMTS Heterogeneous Networks", 3GPP TSG-RAN WG3 Meeting #79b, Apr. 15-19, 2013, Chicago, USA, R3-130519, 6 pages.

* cited by examiner

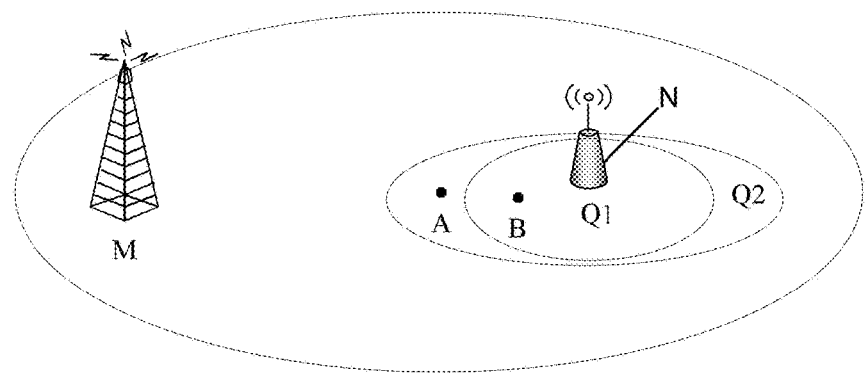

FIG. 1

```
┌─────────────────────────────────────────────────────────────┐  ┌─ 201
│ A first wireless communication node determines whether a    │
│ terminal is within downlink coverage of a second wireless   │
│ communication node                                          │
└─────────────────────────────────────────────────────────────┘
                              ▼
┌─────────────────────────────────────────────────────────────┐  ┌─ 202
│  When the first wireless communication node determines that │
│  the terminal is not within the downlink coverage of the    │
│  second wireless communication node, the first wireless     │
│  communication node instructs the terminal to use a         │
│  non-feedback mode; and/or the first wireless               │
│  communication node instructs the second wireless           │
│  communication node to use a non-feedback mode              │
└─────────────────────────────────────────────────────────────┘
```

FIG. 2

```
┌─────────────────────────────────────────────────────────────┐  ┌─ 301
│ A terminal sends a measurement report of a downlink         │
│ reference signal of at least one cell to a first wireless   │
│ communication node                                          │
└─────────────────────────────────────────────────────────────┘
                              ▼
┌─────────────────────────────────────────────────────────────┐  ┌─ 302
│ When the measurement report includes an identifier of the   │
│ at least one cell, and the identifier of the at least one   │
│ cell does not include an identifier of a cell served by a   │
│ second wireless communication node, the terminal receives   │
│ instruction information that is sent by the first wireless  │
│ communication node and used to instruct to use a            │
│ non-feedback mode                                           │
└─────────────────────────────────────────────────────────────┘
                              ▼
┌─────────────────────────────────────────────────────────────┐  ┌─ 303
│ The terminal uses the non-feedback mode to perform uplink   │
│ data transmission                                           │
└─────────────────────────────────────────────────────────────┘
```

FIG. 3

METHOD FOR UPLINK DATA TRANSMISSION, TERMINAL, AND WIRELESS COMMUNICATION NODE

CROSS REFERENCE

This application is a continuation of International Application No. PCT/CN2013/078587, filed on Jul. 1, 2013, which is hereby incorporated by reference in its entirety.

TECHNICAL FIELD

Embodiments of the present invention relate to the communications field, and in particular, to a method for uplink data transmission, a terminal, and a wireless communication node.

BACKGROUND

In an uplink and downlink separation technology, when a terminal receives downlink data, the terminal selects a cell corresponding to a maximum downlink signal received power as a serving cell; when the terminal sends uplink data, the terminal selects a cell corresponding to a smallest uplink path loss as a serving cell. In a heterogeneous network system, when uplink or downlink data is transmitted between a terminal and a network side, to maximize a downlink signal received power and minimize an uplink path loss, the uplink and downlink separation technology is used, that is, when the terminal sends uplink data to or receives downlink data from the network side, different wireless communication nodes are used as serving base stations for the terminal.

When the uplink and downlink separation technology is used, uplink coverage and downlink coverage of a wireless communication node are not necessarily same coverage.

For example, for a terminal whose uplink serving node is a micro base station and whose downlink serving node is a macro base station, when the terminal sends uplink data to the micro base station, if hybrid automatic repeat request (HARQ) feedback information sent by the micro base station by using a physical hybrid automatic repeat request indicator channel (PHICH) cannot be received within a specified time, the terminal considers that the micro base station does not successfully receive the sent uplink data and therefore the terminal sends the uplink data to the micro base station again.

For a terminal that is not within downlink coverage of the micro base station, the terminal cannot receive a HARQ feedback message sent by the micro base station, and cannot determine, according to the HARQ feedback message sent by the micro base station, whether to retransmit uplink data to the base station, and therefore, a HARQ mechanism between the terminal and the micro base station cannot work. For example, the terminal sends uplink data to the micro base station, where the uplink data is successfully received by the micro base station, and the micro base station sends, on a PHICH, an acknowledgment indication (ACK) to the terminal. However, because the terminal is not within the downlink coverage of the micro base station, the terminal cannot receive downlink data and downlink signaling from the micro base station and the terminal cannot receive the acknowledgment indication sent by the micro base station, so that the terminal uses, in a corresponding subframe according to a time sequence requirement, a time-frequency resource on which the uplink data is sent at the first time, to retransmit the uplink data. However, the micro base station has successfully received the data, and the micro base station schedules another terminal on the time-frequency resource on which the terminal retransmits the uplink data. Consequently, a conflict occurs when another terminal uses the time frequency resource.

SUMMARY

Embodiments of the present invention provide a method for uplink data transmission, a terminal, and a wireless communication node, which can ensure that a HARQ mechanism between a terminal and a wireless communication node works normally.

To achieve the foregoing objective, the following technical solutions are used in the embodiments of the present invention.

A first aspect of the present invention provides a method for uplink data transmission, wherein the method includes:
  determining, by a first wireless communication node, whether a terminal is within downlink coverage of a second wireless communication node; and
  when the first wireless communication node determines that the terminal is not within the downlink coverage of the second wireless communication node, instructing, by the first wireless communication node, the terminal to use a non-feedback mode; and/or instructing, by the first wireless communication node, the second wireless communication node to use a non-feedback mode, where
  the first wireless communication node is a downlink serving node of the terminal, and the second wireless communication node is an uplink serving node of the terminal.

According to the first aspect, in a first possible implementation manner of the first aspect, the determining, by a first wireless communication node, whether the terminal is within downlink coverage of the second wireless communication node includes:
  receiving, by the first wireless communication node, a measurement report of the terminal for a downlink reference signal of at least one cell, where the measurement report includes an identifier of the at least one cell;
  determining, by the first wireless communication node, whether the identifier of the at least one cell includes an identifier of a cell served by the second wireless communication node; and
  if the identifier of the at least one cell does not include the identifier of the cell served by the second wireless communication node, determining, by the first wireless communication node, that the terminal is not within the downlink coverage of the second wireless communication node.

With reference to the first aspect or the first possible implementation manner of the first aspect, in a second possible implementation manner of the first aspect, the determining, by a first wireless communication node, whether the terminal is within downlink coverage of the second wireless communication node includes:
  receiving, by the first wireless communication node, a measurement report of the terminal for a downlink reference signal of a cell served by the second wireless communication node, where the measurement report includes a reference signal measurement result of the downlink reference signal of the cell served by the second wireless communication node; and if the reference signal measurement result of the downlink reference signal is not greater than a preset threshold, determining, by the first wireless communication node, that the terminal is not within the downlink coverage of the second wireless communication node.

According to a second aspect, a method for uplink data transmission is provided, where the method includes:

sending, by a terminal, a measurement report for a downlink reference signal of at least one cell to a first wireless communication node;

when the measurement report includes an identifier of the at least one cell, and the identifier of the at least one cell does not include an identifier of a cell served by a second wireless communication node, receiving, by the terminal, instruction information that is sent by the first wireless communication node and used to instruct to use a non-feedback mode; or when the measurement report includes a measurement result of a downlink reference signal of a cell served by the second wireless communication node, and the measurement result of the downlink reference signal of the cell served by the second wireless communication node is not greater than a preset threshold, receiving, by the terminal, instruction information that is sent by the first wireless communication node and used to instruct to use a non-feedback mode;

using, by the terminal, the non-feedback mode to perform uplink data transmission, where the first wireless communication node is a downlink serving node of the terminal, and the second wireless communication node is an uplink serving node of the terminal.

According to a third aspect, a method for uplink data transmission is provided, where the method includes:

measuring, by a terminal, a downlink reference signal of at least one cell to obtain a measurement result of the downlink reference signal; and when the terminal determines, according to the measurement result, that the terminal is not within downlink coverage of a cell served by a second wireless communication node, using, by the terminal, a non-feedback mode to perform uplink data transmission, and instructing the second wireless communication node to use the non-feedback mode, where the second wireless communication node is an uplink serving node of the terminal; or when the terminal sends the measurement result to the second wireless communication node, if the second wireless communication node determines, according to the measurement result, that the terminal is not within downlink coverage of a cell served by the second wireless communication node, receiving, by the terminal, instruction information that is forwarded by the second wireless communication node by using a first wireless communication node and used to instruct to use a non-feedback mode, and using, by the terminal according to the instruction information, the non-feedback mode to perform uplink data transmission, where the first wireless communication node is a downlink serving node of the terminal, and the second wireless communication node is an uplink serving node of the terminal.

According to a fourth aspect, a method for uplink data transmission is provided, where the method includes:

receiving, by a second wireless communication node, a measurement report that is sent by a terminal and that is for at least one cell; and when the measurement report includes an identifier of the at least one cell, if the identifier of the at least one cell does not include an identifier of a cell served by the second wireless communication node, determining, by the second wireless communication node, that the terminal is not within downlink coverage of the second wireless communication node, and using, by the second wireless communication node, a non-feedback mode, and instructing the terminal to use the non-feedback mode to perform uplink data transmission, where the second wireless communication node is a downlink serving node of the terminal; or when the measurement report includes a measurement result of a downlink reference signal of a cell served by the second wireless communication node, determining, by the second wireless communication node, whether the measurement result of the downlink reference signal of the cell served by the second wireless communication node is less than or equal to a predetermined threshold, and if yes, determining, by the second wireless communication node, that the terminal is not within coverage of the second wireless communication node, and using, by the second wireless communication node, a non-feedback mode, and instructing the terminal to use the non-feedback mode to perform uplink data transmission.

According to a fifth aspect, a wireless communication node is provided, where the wireless communication node is a first wireless communication node, and the first wireless communication node includes a determining unit and an instructing unit, where:

the determining unit is configured to determine whether a terminal is within downlink coverage of a second wireless communication node; and the instructing unit is configured to: when the determining unit determines that the terminal is not within the downlink coverage of the second wireless communication node, instruct the terminal to use a non-feedback mode; and/or instruct the second wireless communication node to use a non-feedback mode, where the first wireless communication node is a downlink serving node of the terminal, and the second wireless communication node is an uplink serving node of the terminal.

With reference to the fifth aspect, in a first possible implementation manner of the fifth aspect, the determining unit is specifically configured to:

receive a measurement report of the terminal for a downlink reference signal of at least one cell, where the measurement report includes an identifier of the at least one cell;

determine whether the identifier of the at least one cell includes an identifier of a cell served by the second wireless communication node; and if the identifier of the at least one cell does not include the identifier of the cell served by the second wireless communication node, determine that the terminal is not within the downlink coverage of the second wireless communication node.

With reference to the fifth aspect or the first possible implementation manner of the fifth aspect, in a second possible implementation manner of the fifth aspect, the determining unit is specifically configured to:

receive a measurement report of the terminal for a downlink reference signal of a cell served by the second wireless communication node, where the measurement report includes a reference signal measurement result of the downlink reference signal of the cell served by the second wireless communication node; and if the reference signal measurement result of the downlink reference signal is not greater than a preset threshold, determine that the terminal is not within the downlink coverage of the second wireless communication node.

According to a sixth aspect, a terminal is provided, where the terminal includes a sending unit, a receiving unit, and a data transmission unit, where:

the sending unit is configured to send a measurement report for a downlink reference signal of at least one cell to a first wireless communication node;

the receiving unit is configured to: when the measurement report sent by the sending unit includes an identifier of the at least one cell, and the identifier of the at least one cell does not include an identifier of a cell served by a second wireless communication node, receive instruction information that is sent by the first wireless communication node and used to instruct to use a non-feedback mode; or when the measurement report sent by the sending unit includes a measurement result of a downlink reference signal of a cell served by the second wireless communication node, and the measurement result of the downlink reference signal of the cell served by the second wireless communication node is not greater than a preset threshold, receive instruction information that is sent by the first wireless communication node and used to instruct to use a non-feedback mode; and the data transmission unit is configured to use the non-feedback mode to perform uplink data transmission, where the first wireless communication node is a downlink serving node of the terminal, and the second wireless communication node is an uplink serving node of the terminal.

According to a seventh aspect, a terminal is provided, where the terminal includes a measuring unit and a processing unit, where:

the measuring unit is configured to measure a downlink reference signal of at least one cell to obtain a measurement result of the downlink reference signal; and the processing unit is configured to: when the terminal determines, according to the measurement result obtained by the measuring unit, that the terminal is not within downlink coverage of a cell served by a second wireless communication node, use a non-feedback mode to perform uplink data transmission, and instruct the second wireless communication node to use the non-feedback mode, where the second wireless communication node is an uplink serving node of the terminal;

or the terminal includes a measuring unit, a receiving unit, and a data transmission unit, where:

the measuring unit is configured to measure a downlink reference signal of at least one cell to obtain a measurement result of the downlink reference signal;

the receiving unit is configured to: when the terminal sends the measurement result obtained by the measuring unit to the second wireless communication node, if the second wireless communication node determines, according to the measurement result, that the terminal is not within downlink coverage of a cell served by the second wireless communication node, receive instruction information that is forwarded by the second wireless communication node by using a first wireless communication node and used to instruct to use a non-feedback mode; and the data transmission unit is configured to use, according to the instruction information received by the receiving unit, the non-feedback mode to perform uplink data transmission, where the first wireless communication node is a downlink serving node of the terminal, and the second wireless communication node is an uplink serving node of the terminal.

According to an eighth aspect, a wireless communication node is provided, where the wireless communication node is a second wireless communication node, and the second wireless communication node includes a receiving unit, a first determining unit, and a first data transmission unit, where:

the receiving unit is configured to receive a measurement report that is sent by a terminal and that is for at least one cell;

the first determining unit is configured to: when the measurement report received by the receiving unit includes an identifier of the at least one cell, if the identifier of the at least one cell does not include an identifier of a cell served by the second wireless communication node, determine that the terminal is not within downlink coverage of the second wireless communication node; and the first data transmission unit is configured to: when the first determining unit determines that the terminal is not within the downlink coverage of the second wireless communication node, use a non-feedback mode, and instruct the terminal to use the non-feedback mode to perform uplink data transmission, where the second wireless communication node is a downlink serving node of the terminal;

or the second wireless communication node includes a receiving unit, a second determining unit, and a second data transmission unit, where:

the receiving unit is configured to receive a measurement report that is sent by a terminal and that is for at least one cell;

the second determining unit is configured to: when the measurement report received by the receiving unit includes a measurement result of a downlink reference signal of a cell served by the second wireless communication node, determine whether the measurement result of the downlink reference signal of the cell served by the second wireless communication node is less than or equal to a predetermined threshold, and if yes, determine, by the second wireless communication node, that the terminal is not within coverage of the second wireless communication node; and the second data transmission unit is configured to: when the second determining unit determines that the terminal is not within the coverage of the second wireless communication node, use a non-feedback mode, and instruct the terminal to use the non-feedback mode to perform uplink data transmission.

According to a ninth aspect, a wireless communication node is provided, where the wireless communication node is a first wireless communication node, and the first wireless communication node includes a processor, where:

the processor is configured to determine whether a terminal is within downlink coverage of a second wireless communication node; and the processor is further configured to: when determining that the terminal is not within the downlink coverage of the second wireless communication node, instruct the terminal to use a non-feedback mode; and/or instruct the second wireless communication node to use a non-feedback mode, where the first wireless communication node is a downlink serving node of the terminal, and the second wireless communication node is an uplink serving node of the terminal.

With reference to the ninth aspect, in a first possible implementation manner of the ninth aspect, the processor is specifically configured to:

receive a measurement report of the terminal for a downlink reference signal of at least one cell, where the measurement report includes an identifier of the at least one cell;

determine whether the identifier of the at least one cell includes an identifier of a cell served by the second wireless communication node; and if the identifier of the at least one cell does not include the identifier of the cell served by the second wireless communication node, determine that the terminal is not within the downlink coverage of the second wireless communication node.

With reference to the ninth aspect or the first possible implementation manner of the ninth aspect, in a second possible implementation manner of the ninth aspect, the processor is specifically configured to:

receive a measurement report of the terminal for a downlink reference signal of a cell served by the second wireless communication node, where the measurement report includes a reference signal measurement result of the downlink reference signal of the cell served by the second wireless communication node; and if the reference signal measurement result of the downlink reference signal is not greater than a preset threshold, determine that the terminal is not within the downlink coverage of the second wireless communication node.

According to a tenth aspect, a terminal is provided, where the terminal includes a transmitter, a receiver, and a processor, where:

the transmitter is configured to send a measurement report of a downlink reference signal of at least one cell to a first wireless communication node;

the receiver is configured to: when the measurement report sent by the transmitter includes an identifier of the at least one cell, and the identifier of the at least one cell does not include an identifier of a cell served by a second wireless communication node, receive instruction information that is sent by the first wireless communication node and used to instruct to use a non-feedback mode; or when the measurement report sent by the transmitter includes a measurement result of a downlink reference signal of a cell served by the second wireless communication node, and the measurement result of the downlink reference signal of the cell served by the second wireless communication node is not greater than a preset threshold, receive instruction information that is sent by the first wireless communication node and used to instruct to use a non-feedback mode; and the processor is configured to use the non-feedback mode to perform uplink data transmission, where the first wireless communication node is a downlink serving node of the terminal, and the second wireless communication node is an uplink serving node of the terminal.

According to an eleventh aspect, a terminal is provided, where the terminal includes a processor, where:

the processor is configured to measure a downlink reference signal of at least one cell to obtain a measurement result of the downlink reference signal; and the processor is further configured to: when the terminal determines, according to the measurement result, that the terminal is not within downlink coverage of a cell served by a second wireless communication node, use a non-feedback mode to perform uplink data transmission, and instruct the second wireless communication node to use the non-feedback mode, where the second wireless communication node is an uplink serving node of the terminal;

or the terminal includes a processor and a receiver, where:

the processor is configured to measure a downlink reference signal of at least one cell to obtain a measurement result of the downlink reference signal;

the receiver is configured to: when the terminal sends the measurement result obtained by the processor to the second wireless communication node, if the second wireless communication node determines, according to the measurement result, that the terminal is not within downlink coverage of a cell served by the second wireless communication node, receive instruction information that is forwarded by the second wireless communication node by using a first wireless communication node and used to instruct to use a non-feedback mode; and the processor is further configured to use, according to the instruction information received by the receiver, the non-feedback mode to perform uplink data transmission, where the first wireless communication node is a downlink serving node of the terminal, and the second wireless communication node is an uplink serving node of the terminal.

According to a twelfth aspect, a wireless communication node is provided, where the wireless communication node is a second wireless communication node, and the second wireless communication node includes a receiver and a processor, where:

the receiver is configured to receive a measurement report for that is sent by a terminal and that is for at least one cell;

the processor is configured to: when the measurement report received by the receiver includes an identifier of the at least one cell, if the identifier of the at least one cell does not include an identifier of a cell served by the second wireless communication node, determine that the terminal is not within downlink coverage of the second wireless communication node; and the processor is further configured to: when determining that the terminal is not within the downlink coverage of the second wireless communication node, use a non-feedback mode, and instruct the terminal to use the non-feedback mode to perform uplink data transmission, where the second wireless communication node is a downlink serving node of the terminal;

or the second wireless communication node includes a receiver and a processor, where:

the receiver is configured to receive a measurement report for that is sent by a terminal and that is for at least one cell;

the processor is configured to: when the measurement report received by the receiver includes a measurement result of a downlink reference signal of a cell served by the second wireless communication node, determine whether the measurement result of the downlink reference signal of the cell served by the second wireless communication node is less than or equal to a predetermined threshold, and if yes, determine, by the second wireless communication node, that the terminal is not within coverage of the second wireless communication node; and the processor is further configured to: when determining that the terminal is not within the coverage of the second wireless communication node, use a non-feedback mode, and instruct the terminal to use the non-feedback mode to perform uplink data transmission.

The embodiments of the present invention provide a method for uplink data transmission, a terminal, and a wireless communication node. A first wireless communication node determines whether a terminal is within downlink coverage of a second wireless communication node; and when the first wireless communication node determines that the terminal is not within the downlink coverage of the second wireless communication node, the first wireless communication node instructs the terminal to use a non-feedback mode; and/or the first wireless communication node instructs the second wireless communication node to use a non-feedback mode.

According to the solutions, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of a scenario according to an embodiment of the present invention;

FIG. 2 is a schematic flowchart of a method for uplink data transmission according to an embodiment of the present invention;

FIG. 3 is a schematic flowchart of another method for uplink data transmission according to an embodiment of the present invention;

DESCRIPTION OF EMBODIMENTS

Figure 4:
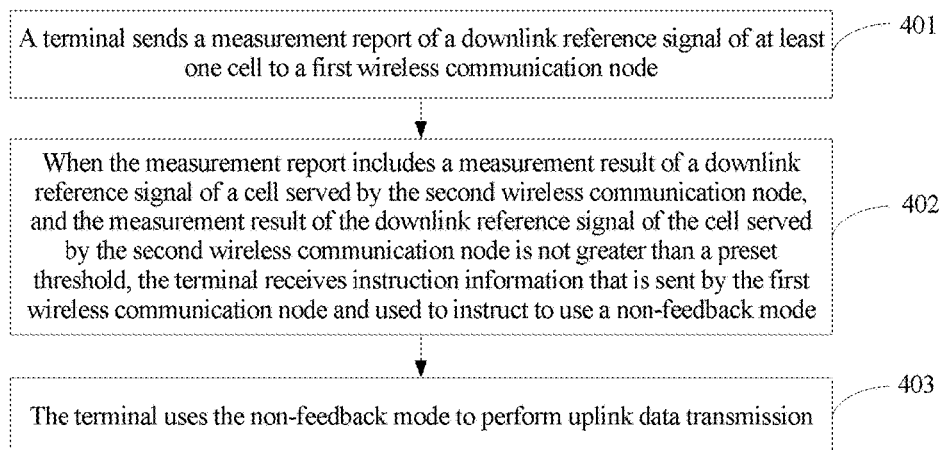
FIG. 4 is a schematic flowchart of still another method for uplink data transmission according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

As shown in FIG. 1, a second wireless communication node N is an uplink serving node of a terminal, and a first wireless communication node M is a downlink serving node of the terminal, where uplink coverage of the first wireless communication node M is not narrower than uplink coverage of the second wireless communication node N. Q1 is downlink coverage of the second wireless communication node, and Q2 is the uplink coverage of the second wireless communication node. When the terminal is in a position B, the terminal is within the downlink coverage of the second wireless communication node N; when the terminal is in a position A, the terminal is not within the downlink coverage of the second wireless communication node N. When the terminal is in the position A or moves from the position B to the position A, the terminal is within downlink coverage of the first wireless communication node M and is within the uplink coverage of the second wireless communication node N but is not within the downlink coverage of the second wireless communication node.

It should be noted that the second wireless communication node refers to a node with a scheduling function, The second wireless communication node may specifically be a base station, a micro base station, a small-cell base station, a relay station, a home base station, or the like.

Embodiment 1

Based on the foregoing scenario, this embodiment of the present invention provides a method for uplink data transmission, where the method is performed by a first wireless communication node. As shown in FIG. 2, the method includes the following steps:

201. The first wireless communication node determines whether a terminal is within downlink coverage of a second wireless communication node.

The first wireless communication node is a downlink serving node of the terminal, and the second wireless communication node is an uplink serving node of the terminal.

Specifically, the first wireless communication node may determine, according to a received measurement report of the terminal for a downlink reference signal of at least one cell, whether the terminal is within the downlink coverage of the second wireless communication node.

Certainly, the first wireless communication node may also determine, according to a received measurement report of the terminal for a downlink reference signal of a cell served by the second wireless communication node, whether the terminal is within the downlink coverage of the second wireless communication node.

202. When the first wireless communication node determines that the terminal is not within the downlink coverage of the second wireless communication node, the first wireless communication node instructs the terminal to use a non-feedback mode; and/or the first wireless communication node instructs the second wireless communication node to use a non-feedback mode.

When the terminal is not within the downlink coverage of the second wireless communication node, after the terminal sends uplink data to the second wireless communication node, to ensure that the terminal does not retransmit the uplink data to the second wireless communication node even if no HARQ feedback message sent by the second wireless communication node is received, the first wireless communication node may instruct the terminal to use the non-feedback mode; or instruct the second wireless communication node to use the non-feedback mode; or instruct the terminal and the second wireless communication node to use the non-feedback mode.

Specifically, when the first wireless communication node instructs the terminal and/or the second wireless communication node to use the non-feedback mode, the first wireless communication node may send an instruction message to the terminal and/or the second wireless communication node, where the instruction message instructs the terminal and/or the second wireless communication node to use the non-feedback mode.

This embodiment of the present invention provides a method for uplink data transmission. A first wireless communication node determines whether a terminal is within downlink coverage of a second wireless communication node; and when the first wireless communication node determines that the terminal is not within the downlink coverage of the second wireless communication node, the first wireless communication node instructs the terminal to use a non-feedback mode; and/or the first wireless communication node instructs the second wireless communication node to use a non-feedback mode.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 2

Based on the foregoing scenario, this embodiment of the present invention provides a method for uplink data transmission, where the method is performed by a terminal. As shown in FIG. 3, the method includes the following steps:

301. The terminal sends a measurement report for a downlink reference signal of at least one cell to a first wireless communication node.

The first wireless communication node is a downlink serving node of the terminal Specifically, the downlink serving node is a node providing downlink data for the terminal. In the present invention, the first wireless communication node provides at least the downlink data for the terminal. Certainly, the first wireless communication node may also receive uplink data sent by the terminal, and provide an uplink service for the terminal, which is not limited by the present invention.

The terminal may obtain measurement configuration information for measuring the downlink reference signal of the at least one cell.

Specifically, the terminal may receive the measurement configuration information that is sent by the first wireless communication node and used to measure the downlink reference signal of the at least one cell.

It is understood by a person skilled in the art of the present invention that, when the terminal is in a connected state, the first wireless communication node sends the downlink reference signal of the at least one cell to the terminal by using the Radio Resource Control (RRC) protocol. The downlink reference signal of the at least one cell may be specifically included in the measurement configuration information. The downlink reference signal of the at least one cell includes a measurement object parameter and a reporting configuration parameter of the at least one cell.

The measurement object parameter should include at least a parameter of the least one cell, where the parameter includes at least a physical cell identifier of the at least one cell.

It should be noted that a downlink reference signal of each cell may be at least one of a cell-specific reference signal (CRS), a demodulation reference signal (DM RS), and a channel state information reference signal (CSI-RS) of each cell. The CSI-RS of each cell is sent by the first wireless communication node to the terminal; and reference signals except the CSI-RS, for example, the CRS and the DM RS, are acquired by the terminal according to a physical cell identifier of a second wireless communication node.

After the terminal obtains the downlink reference signal of the at least one cell, the terminal measures the at least one cell according to the downlink reference signal of the at least one cell, obtains a measurement result, and generates a measurement report.

302. When the measurement report includes an identifier of the at least one cell, and the identifier of the at least one cell does not include an identifier of a cell served by a second wireless communication node, the terminal receives instruction information that is sent by the first wireless communication node and used to instruct to use a non-feedback mode.

Specifically, when the measurement report does not include the identifier of the cell served by the second wireless communication node, the terminal is not within downlink coverage of the second wireless communication node. After the terminal sends the measurement report to the first wireless communication node, the first wireless communication node may determine that the terminal is not within the downlink coverage of the second wireless communication node, and the first wireless communication node may send, to the terminal, the instruction information that is used to instruct the terminal to use the non-feedback mode.

303. The terminal uses the non-feedback mode to perform uplink data transmission.

Specifically, when the terminal uses the non-feedback mode, the terminal discards a HARQ feedback message sent by the second wireless communication node, or determines to retransmit the uplink data to the second wireless communication node for at least one time.

Optionally, as shown in FIG. 4, the method includes the following steps:

401. The terminal sends a measurement report of a downlink reference signal of at least one cell to a first wireless communication node.

402. When the measurement report includes a measurement result of a downlink reference signal of a cell served by the second wireless communication node, and the measurement result of the downlink reference signal of the cell served by the second wireless communication node is not greater than a preset threshold, the terminal receives instruction information that is sent by the first wireless communication node and used to instruct to use a non-feedback mode.

The measurement report may specifically include a neighboring cell list of a cell that meets an event trigger reporting configuration. The neighboring cell list may include a physical cell identifier and a measurement quantity corresponding to the physical cell identifier. The measurement quantity may include at least one of a channel quality indicator (CQI), reference signal received power (RSRP), reference signal received quality (RSRQ) of a measurement object.

When at least one item in the measurement result is not greater than a corresponding preset threshold, the terminal receives the instruction information that is sent by the first wireless communication node and used to instruct to use the non-feedback mode.

Specifically, when at least one item in the measurement result is not greater than the corresponding preset threshold, the terminal is not within downlink coverage of the second wireless communication node. After the terminal sends the measurement report to the first wireless communication node, the first wireless communication node may determine that the terminal is not within the downlink coverage of the second wireless communication node, and the first wireless communication node may send, to the terminal, the instruction information that is used to instruct the terminal to use the non-feedback mode.

403. The terminal uses the non-feedback mode to perform uplink data transmission.

Specifically, when the terminal uses the non-feedback mode, the terminal discards a HARQ feedback message sent by the second wireless communication node, or determines to retransmit the uplink data to the second wireless communication node for at least one time.

This embodiment of the present invention provides a method for uplink data transmission. A terminal sends a measurement report of a downlink reference signal of at least one cell to a first wireless communication node; and when the measurement report includes an identifier of the at least one cell, and the identifier of the at least one cell does not include an identifier of a cell served by a second wireless communication node, the terminal receives instruction information that is sent by the first wireless communication node and used to instruct to use a non-feedback mode. Alternatively, a terminal sends a measurement report offer a downlink reference signal of at least one cell to a first wireless communication node; when the measurement report includes a measurement result of a downlink reference signal of a cell served by the second wireless communication node, and the measurement result of the downlink reference signal of the cell served by the second wireless communication node is not greater than a preset threshold, the terminal receives instruction information that is sent by the first wireless communication node and used to instruct to use a non-feedback mode; and the terminal uses the non-feedback mode to perform uplink data transmission.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 3

Figure 5:
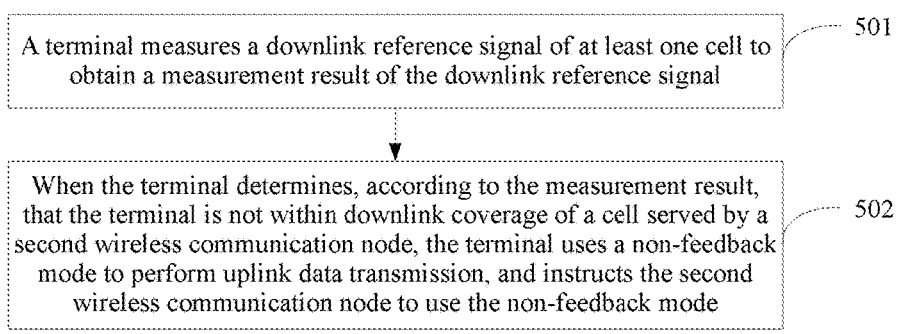
FIG. 5 is a schematic flowchart of yet another method for uplink data transmission according to an embodiment of the present invention.

Based on the foregoing scenario, this embodiment of the present invention provides a method for uplink data transmission, where the method is performed by a terminal. As shown in FIG. 5, the method includes the following steps:

501. The terminal measures a downlink reference signal of at least one cell to obtain a measurement result of the downlink reference signal.

A downlink reference signal of each cell includes a measurement object parameter and a reporting configuration parameter of each cell.

It should be noted that the downlink reference signal of each cell may be at least one of a cell-specific reference signal (CRS), a demodulation reference signal (DM RS), and a channel state information reference signal (CSI-RS) of each cell. The CSI-RS of each cell is sent by the first wireless communication node to the terminal; and reference signals except the CSI-RS, for example, the CRS and the DM RS, are acquired by the terminal according to a physical cell identifier of a second wireless communication node.

The measurement object parameter should include at least one of configuration information of a carrier frequency of the cell, configuration information of a physical cell identifier (PCI) of the cell, and configuration information of a channel state information reference signal (CSI-RS) of the cell. The configuration information of the CSI-RS indicates a time-frequency resource on which the reference signal is sent.

The reporting configuration parameter may be a physical layer reporting configuration parameter or a layer-3 reporting configuration parameter. The physical layer reporting configuration parameter includes a channel quality indicator (CQI) reporting configuration; the CQI reporting configuration may be classified into a periodic reporting configuration and aperiodic reporting configuration information. The layer-3 reporting configuration is classified into an event trigger reporting configuration type and a periodic trigger reporting configuration type, where each reporting configuration has a separate identifier. An event trigger reporting configuration includes an event type and a threshold, and duration in which a trigger condition is met. The periodic trigger reporting configuration includes a reporting period and a purpose of a periodic trigger.

After the terminal obtains the downlink reference signal of the at least one cell, the terminal measures the at least one cell according to the measurement object parameter of the at least one cell that is included in the downlink reference signal of the at least one cell, obtains a measurement result, and generates a measurement report.

Specifically, when the measurement object parameter does not include the configuration information of the channel state information reference signal, the terminal measures a reference signal other than the channel state information reference signal to obtain a measurement result.

The measurement result varies according to the reporting configuration parameter. When the reporting configuration parameter is the layer-3 reporting configuration, and the layer-3 reporting configuration is the event trigger reporting configuration, the measurement result may specifically include a neighboring cell list of a cell that meets the event trigger reporting configuration. The neighboring cell list may include a physical cell identifier and a measurement quantity corresponding to the physical cell identifier. The measurement quantity may include at least one of a reference signal received power (RSRP) and reference signal received quality (RSRQ) of a measurement object.

For example, when the reporting configuration parameter is the layer-3 reporting configuration, and the layer-3 reporting configuration is the event trigger reporting configuration, and an event is an event A3 (a neighboring cell is a threshold higher than a serving cell), and the threshold is −25 dB, and duration is 480 ms, if a cell of the second wireless communication node meets the event A3 for 480 ms (that is, a reference signal received power of the cell of the second wireless communication node is at least −25 dB higher than that of the first wireless communication node and the duration reaches 480 ms), the measurement result includes a physical cell identifier of the cell of the second wireless communication node and a measurement quantity of the cell of the second wireless communication node. If the cell of the second wireless communication node does not meet the foregoing condition, the measurement result does not include the physical cell identifier of the cell of the second wireless communication node and the measurement quantity of the cell of the second wireless communication node. Certainly, for other cells in the measurement configuration parameter, manners of obtaining a measurement result are the same, and details are not described herein again in this embodiment of the present invention.

It should be noted that when the layer-3 reporting configuration is the event trigger reporting configuration, the measurement object parameter in the measurement configuration information is measured, and that a measurement result can be generated only when at least one cell included in the measurement object parameter meets an event condition, where the measurement result includes a physical cell identifier of the at least one cell and a measurement quantity corresponding to the physical cell identifier; otherwise, no measurement result can be generated.

When the reporting configuration parameter is the layer-3 reporting configuration, and the layer-3 reporting configuration is the periodic trigger reporting configuration, the measurement result includes at least a measurement quantity of the second wireless communication node.

When the reporting configuration parameter is the physical layer reporting configuration, the measurement result includes at least a CQI measurement value of the second wireless communication node.

502. When the terminal determines, according to the measurement result, that the terminal is not within downlink coverage of a cell served by a second wireless communication node, the terminal uses a non-feedback mode to perform uplink data transmission, and instructs the second wireless communication node to use the non-feedback mode.

The terminal determines, according to the measurement result, that the terminal is not within the downlink coverage of the cell served by the second wireless communication node.

When the measurement report does not include an identifier of the cell served by the second wireless communication node, the terminal may determine that the terminal is not within the downlink coverage of the second wireless communication node, so as to determine to use the non-feedback mode to perform uplink data transmission.

Exemplarily, when the reporting configuration parameter is the layer-3 reporting configuration, and the layer-3 reporting configuration is the event trigger reporting configuration, the terminal may determine, according to whether the measurement result includes the physical cell identifier of the second wireless communication node, whether the terminal is not within the downlink coverage of the second wireless communication node. If the measurement result does not include the physical cell identifier of the second wireless communication node, or no measurement result is detected within a period of time, the terminal is not within the downlink coverage of the second wireless communication node, and the terminal determines that the HARQ feedback mode is a non-feedback mode. The period of time is configured by the terminal according to a specific event, for example, when the event is an event A3, the period of time may be set to be greater than but close to a numeric value of the duration.

Optionally, when the measurement report includes a measurement result of a downlink reference signal of the cell served by the second wireless communication node, the terminal may determine that the terminal is not within downlink coverage of the second wireless communication node, so as to determine to use a non-feedback mode to perform uplink data transmission.

Exemplarily, when the reporting configuration parameter is the layer-3 reporting configuration, and the layer-3 reporting configuration is the periodic trigger reporting configuration, or the reporting configuration parameter is the physical layer reporting configuration, the terminal may determine, according to a measurement value of the CQI, RSRP, or RSRQ of the second wireless communication node in the measurement result, whether the terminal is not within the downlink coverage of the second wireless communication node.

Specifically, if the measurement value of the CQI, RSRP, or RSRQ is not greater than a first threshold, the terminal determines that the terminal is not within the downlink coverage of the second wireless communication node, and the terminal may determine that the HARQ feedback mode is a non-feedback mode or an enhanced feedback mode. It should be noted that for the CQI, RSRP, and RSRQ, the first threshold is not necessarily a same numeric value.

It should be noted that the terminal may use one or two bits to indicate the non-feedback mode. For example, 00 indicates the non-feedback mode. Certainly, other manners may also be used to indicate three feedback modes, which is not specifically limited herein in this embodiment of the present invention.

To save resources, the terminal may further instruct the second wireless communication node to use the non-feedback mode. Exemplarily, the terminal may send instruction information indicating to use the non-feedback mode to the second wireless communication node.

Specifically, when the terminal uses the non-feedback mode, the terminal discards a HARQ feedback message sent by the second wireless communication node, or determines to retransmit the uplink data to the second wireless communication node for at least one time.

Figure 6:
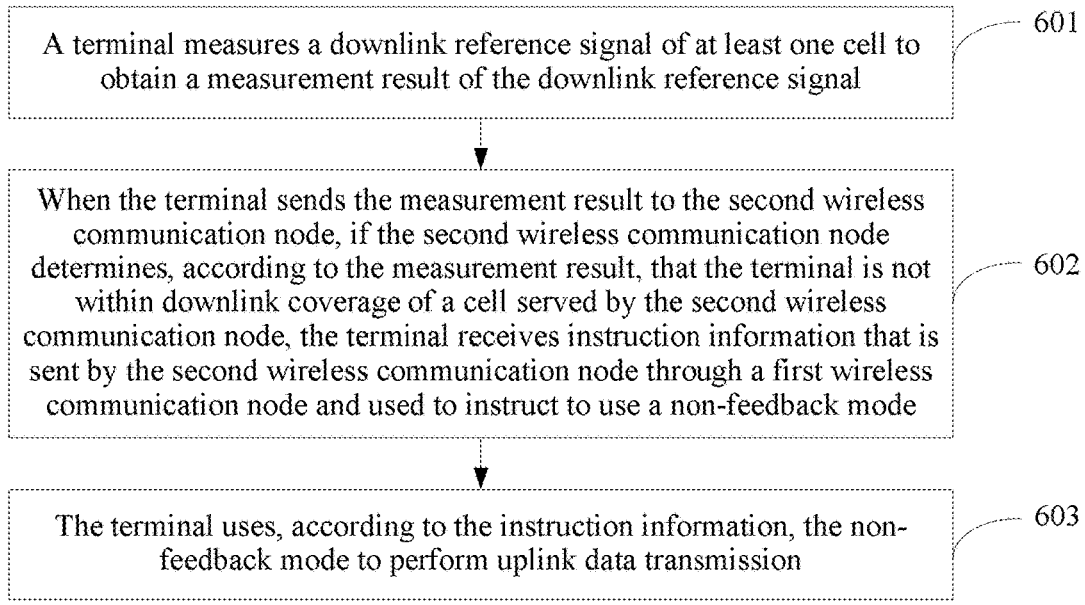
FIG. 6 is a schematic flowchart of still yet another method for uplink data transmission according to an embodiment of the present invention.

Optionally, as shown in FIG. 6, the method includes the following steps:

601. The terminal measures a downlink reference signal of at least one cell to obtain a measurement result of the downlink reference signal.

602. When the terminal sends the measurement result to the second wireless communication node, if the second wireless communication node determines, according to the measurement result, that the terminal is not within downlink coverage of a cell served by the second wireless communication node, the terminal receives instruction information that is forwarded by the second wireless communication node by using a first wireless communication node and used to instruct to use a non-feedback mode.

Specifically, when the measurement report does not include an identifier of the cell served by the second wireless communication node, the terminal is not within the downlink coverage of the second wireless communication node. After the terminal sends the measurement report to the second wireless communication node, the second wireless communication node may determine that the terminal is not within the downlink coverage of the second wireless communication node, and the second wireless communication node may send, to the first wireless communication node, the instruction information that is used to instruct the terminal to use the non-feedback mode. Further, the first wireless communication node may send, to the terminal, the instruction information that is used to instruct the terminal to use the non-feedback mode.

Optionally, when at least one item in the measurement result is not greater than a corresponding preset threshold, the terminal is not within the downlink coverage of the second wireless communication node. After the terminal sends the measurement report to the second wireless communication node, the second wireless communication node may determine that the terminal is not within the downlink coverage of the second wireless communication node, and the second wireless communication node may send, to the first wireless communication node, the instruction information that is used to instruct the terminal to use the non-feedback mode. Further, the first wireless communication node may send, to the terminal, the instruction information that is used to instruct the terminal to use the non-feedback mode.

603. The terminal uses, according to the instruction information, the non-feedback mode to perform uplink data transmission.

Specifically, when the terminal uses the non-feedback mode, the terminal discards a HARQ feedback message sent by the second wireless communication node, or determines to retransmit the uplink data to the second wireless communication node for at least one time.

The terminal determines to discard the HARQ feedback message sent by the second wireless communication node, that is, the terminal determines not to retransmit the uplink data to the second wireless communication node, or the terminal determines that the second wireless communication node successfully receives the uplink data sent by the terminal; or the terminal determines that the second wireless communication node does not send a HARQ feedback.

Because the terminal is not within the downlink coverage of the second wireless communication node, the terminal cannot receive the HARQ feedback message sent by the second wireless communication node, and cannot learn whether the second wireless communication node successfully receives the uplink data sent by the terminal. To ensure that the second wireless communication node can successfully receive the uplink data sent by the terminal, the terminal may retransmit the uplink data to the second wireless communication node for at least one time.

Specifically, when the terminal retransmits the uplink data, the terminal may retransmit, on a time-frequency resource on which the terminal sends the uplink data for the first time, the uplink data to the terminal.

For example, if the terminal sends, on a resource block numbered 5 in a subframe numbered 4, the uplink data to the second wireless communication node for the first time, the terminal may send the uplink data, on a resource block numbered 5 in a subframe numbered 9, the uplink data to the second wireless communication node.

Optionally, a quantity of times of sending the uplink data by the terminal to the second wireless communication node may be implemented by carrying a quantity of times of retransmission, or before a feedback mode is determined, the first wireless communication node may configure a quantity of times of retransmission for the terminal and the second wireless communication node. Certainly, the quantity of times of retransmission may be a same default value that is known by both the second wireless communication node and the terminal.

For example, if the quantity of times of retransmission is 2, the terminal sends the uplink data in a subframe 0, and the terminal retransmits the uplink data in a subframe 8 and a subframe 9; or the terminal retransmits the uplink data in a subframe 8 and a subframe 12.

This embodiment of the present invention provides a method for uplink data transmission. A terminal measures a downlink reference signal of at least one cell to obtain a measurement result of the downlink reference signal; and when the terminal determines, according to the measurement result, that the terminal is not within downlink coverage of a cell served by a second wireless communication node, the terminal uses a non-feedback mode to perform uplink data transmission, and instructs the second wireless communication node to use the non-feedback mode, where the second wireless communication node is an uplink serving node of the terminal. Alternatively, a terminal measures a downlink reference signal of at least one cell to obtain a measurement result of the downlink reference signal; and when the terminal sends the measurement result to the second wireless communication node, if the second wireless communication node determines, according to the measurement result, that the terminal is not within downlink coverage of a cell served by the second wireless communication node, the terminal receives instruction information that is forwarded by the second wireless communication node by using a first wireless communication node and used to instruct to use a non-feedback mode, and the terminal uses, according to the instruction information, the non-feedback mode to perform uplink data transmission, where the first wireless communication node is a downlink serving node of the terminal, and the second wireless communication node is an uplink serving node of the terminal.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 4

Figure 7:
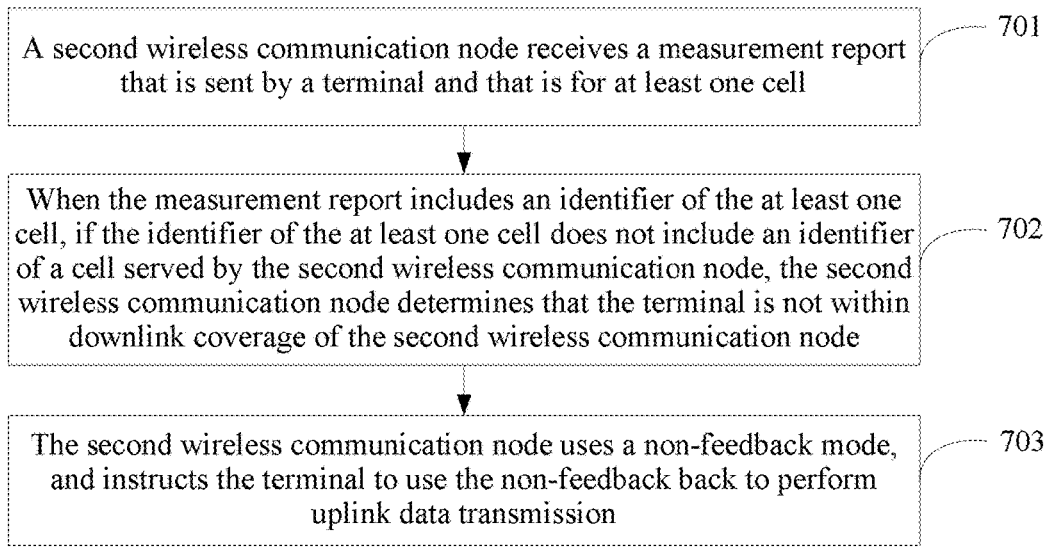
FIG. 7 is a schematic flowchart of a further method for uplink data transmission according to an embodiment of the present invention.

This embodiment of the present invention provides a method for uplink data transmission, where the method is performed by a second wireless communication node. As shown in FIG. 7, the method includes the following steps:

701. The second wireless communication node receives a measurement report that is sent by a terminal and that is for at least one cell.

702. When the measurement report includes an identifier of the at least one cell, if the identifier of the at least one cell does not include an identifier of a cell served by the second wireless communication node, the second wireless communication node determines that the terminal is not within downlink coverage of the second wireless communication node.

703. The second wireless communication node uses a non-feedback mode, and instructs the terminal to use the non-feedback mode to perform uplink data transmission.

When the second wireless communication node uses the non-feedback mode, the second wireless communication node may not send a HARQ feedback message to the terminal after receiving uplink data sent by the terminal. Alternatively, the second wireless communication node may not receive, on a time-frequency resource allocated to the terminal, uplink data retransmitted by the terminal.

Certainly, when the second wireless communication node determines that the terminal is not within the downlink coverage of the second wireless communication node, to ensure correctness of a HARQ mechanism between the terminal and the second wireless communication node and correctness of data transmission between the terminal and the second wireless communication node, the second wireless communication node may also send the at least two HARQ feedback messages to the terminal in at least two consecutive subframes or on at least two consecutive resource blocks of one subframe. Therefore, the terminal receives, in the at least two consecutive subframes or on the at least two consecutive resource blocks of the one subframe, the at least two HARQ feedback messages sent by the second wireless communication node.

For example, the second wireless communication node retransmits, in a subframe 16 and a subframe 17, the HARQ feedback message to the terminal; or the second wireless communication node retransmits, on resource blocks numbered 16 and 17 of a same subframe, the HARQ feedback message to the terminal; the terminal receives the two HARQ feedback messages, combines wanted signals or energy of the two HARQ feedback messages, and then obtains content of the HARQ feedback messages by means of parsing.

Specifically, when the terminal uses the non-feedback mode, the terminal discards the HARQ feedback message sent by the second wireless communication node, or determines to retransmit the uplink data to the second wireless communication node for at least one time.

Figure 8:
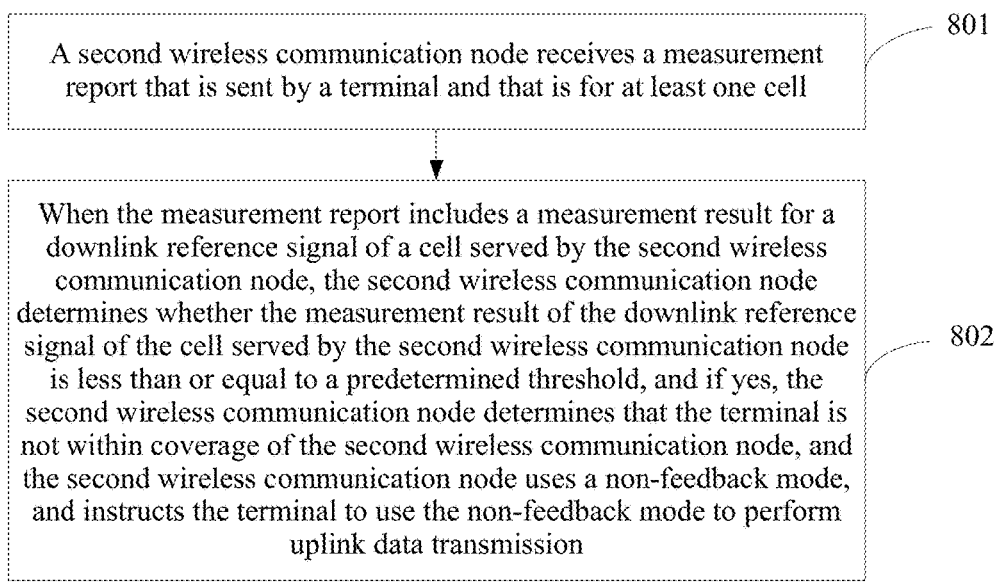
FIG. 8 is a schematic flowchart of a still further method for uplink data transmission according to an embodiment of the present invention.

Optionally, as shown in FIG. 8, the method includes the following steps:

801. The second wireless communication node receives a measurement report that is sent by a terminal and that is for at least one cell.

802. When the measurement report includes a measurement result of a downlink reference signal of a cell served by the second wireless communication node, the second wireless communication node determines whether the measurement result of the downlink reference signal of the cell served by the second wireless communication node is less than or equal to a predetermined threshold, and if yes, the second wireless communication node determines that the terminal is not within coverage of the second wireless communication node, and the second wireless communication node uses a non-feedback mode, and instructs the terminal to use the non-feedback mode to perform uplink data transmission.

This embodiment of the present invention provides a method for uplink data transmission. A second wireless communication node receives a measurement report for that is sent by a terminal and that is for at least one cell; when the measurement report includes an identifier of the at least one cell, if the identifier of the at least one cell does not include an identifier of a cell served by the second wireless communication node, the second wireless communication node determines that the terminal is not within downlink coverage of the second wireless communication node; and the second wireless communication node uses a non-feedback mode, and instructs the terminal to use the non-feedback mode to perform uplink data transmission. Alternatively, a second wireless communication node receives a measurement report that is sent by a terminal and that is for at least one cell; and when the measurement report includes a measurement result of a downlink reference signal of a cell served by the second wireless communication node, the second wireless communication node determines whether the measurement result of the downlink reference signal of the cell served by the second wireless communication node is less than or equal to a predetermined threshold, and if yes, the second wireless communication node determines that the terminal is not within coverage of the second wireless communication node, and the second wireless communication node uses a non-feedback mode, and instructs the terminal to use the non-feedback mode to perform uplink data transmission.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 5

Figure 9A:
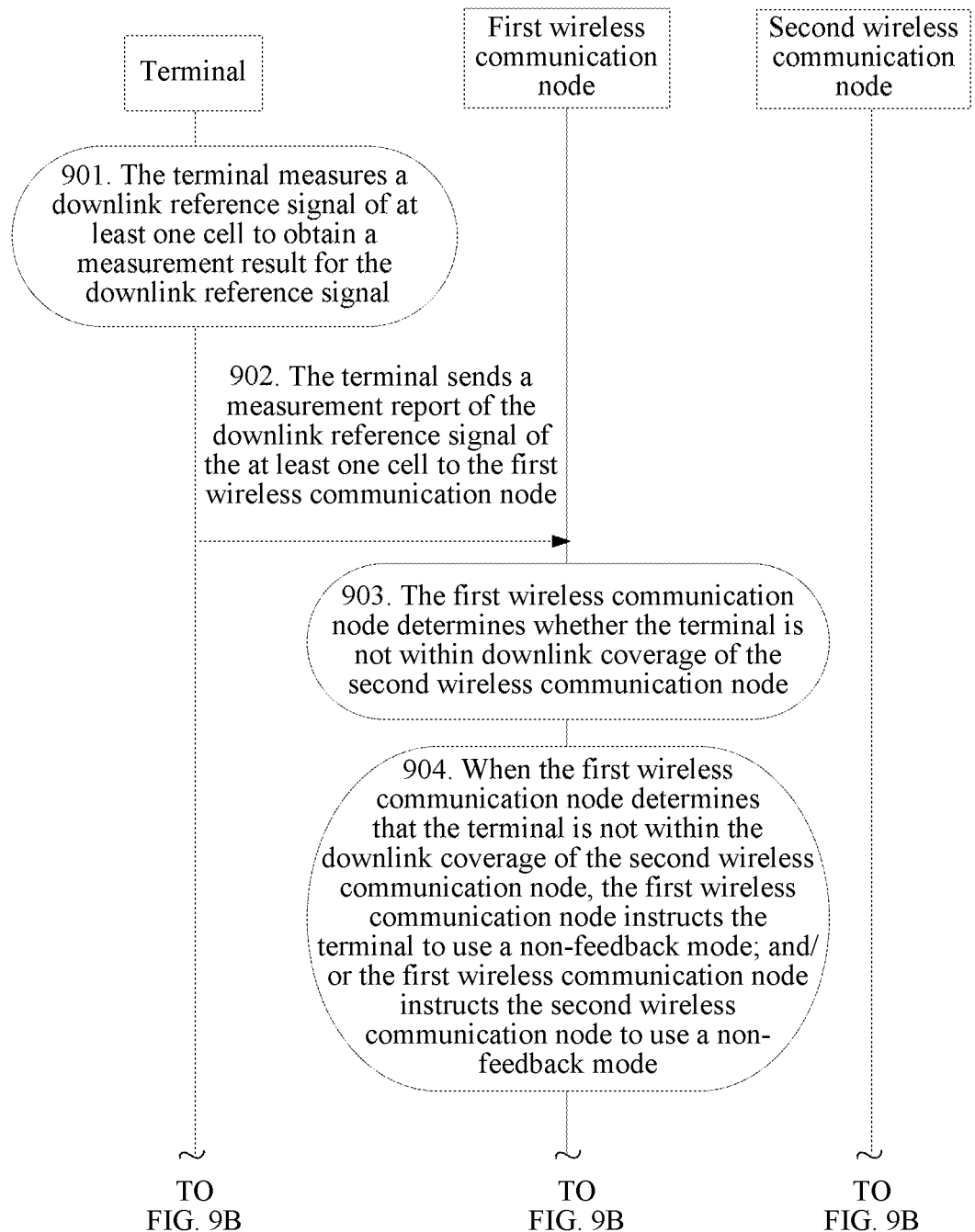
FIG. 9A and FIG. 9B are a schematic interaction diagram of a method for uplink data transmission according to an embodiment of the present invention.
Figure 9B:
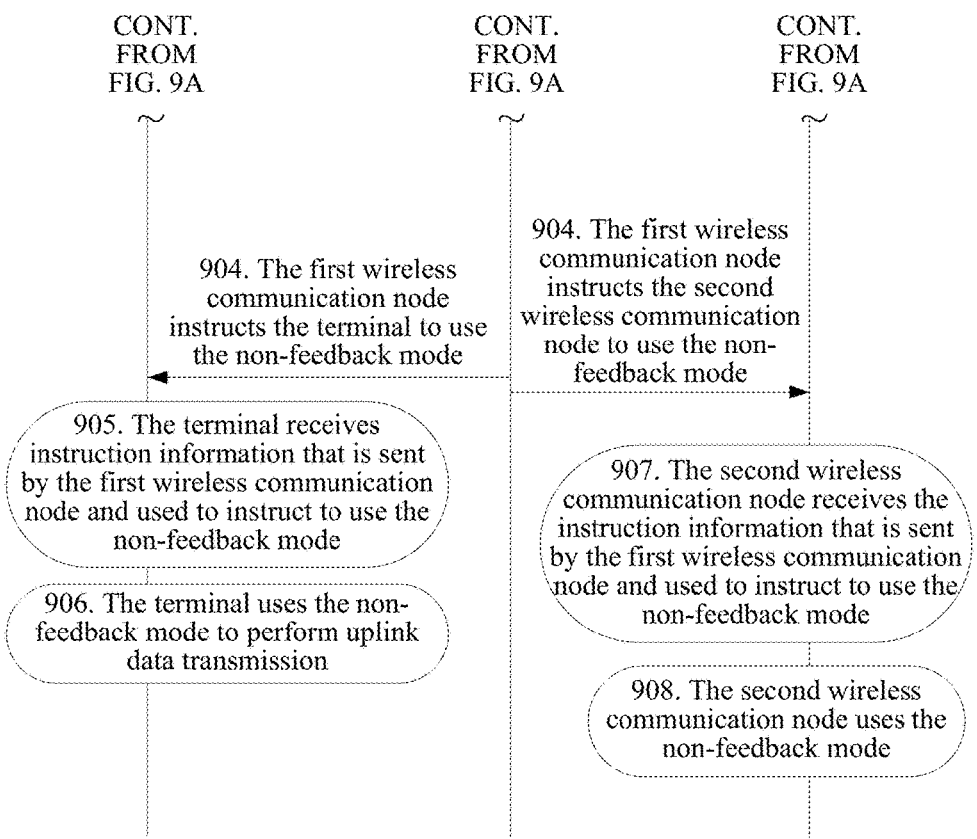

This embodiment of the present invention provides a method for uplink data transmission. As shown in FIG. 9A and FIG. 9B, the method includes the following steps 901. A terminal measures a downlink reference signal of at least one cell to obtain a measurement result of the downlink reference signal.

902. The terminal sends a measurement report for the downlink reference signal of the at least one cell to a first wireless communication node.

903. The first wireless communication node determines whether the terminal is not within downlink coverage of the second wireless communication node.

Specifically, when the measurement report includes an identifier of the at least one cell, the first wireless communication node determines whether the identifier of the at least one cell includes an identifier of a cell served by the second wireless communication node. If the identifier of the at least one cell does not include the identifier of the cell served by the second wireless communication node, the first wireless communication node determines that the terminal is not within the downlink coverage of the second wireless communication node.

Optionally, when the measurement report includes a reference signal measurement result of a downlink reference signal of the cell served by the second wireless communication node, the first wireless communication node determines whether the reference signal measurement result of the downlink reference signal is greater than a preset threshold. If the reference signal measurement result of the downlink reference signal is not greater than the preset threshold, the first wireless communication node determines that the terminal is not within the downlink coverage of the second wireless communication node.

904. When the first wireless communication node determines that the terminal is not within the downlink coverage of the second wireless communication node, the first wireless communication node instructs the terminal to use a non-feedback mode; and/or the first wireless communication node instructs the second wireless communication node to use a non-feedback mode.

When the first wireless communication node instructs the terminal to use the non-feedback mode, steps 905 and 906 are performed. When the first wireless communication node instructs the second wireless communication node to use the non-feedback mode, steps 907 and 908 are performed. When the first wireless communication node instructs the terminal and the second wireless communication node to use the non-feedback mode, steps 905 to 908 are performed.

905. The terminal receives instruction information that is sent by the first wireless communication node and used to instruct to use the non-feedback mode.

906. The terminal uses the non-feedback mode to perform uplink data transmission.

907. The second wireless communication node receives the instruction information that is sent by the first wireless communication node and used to instruct to use the non-feedback mode.

908. The second wireless communication node uses the non-feedback mode.

Figure 10:
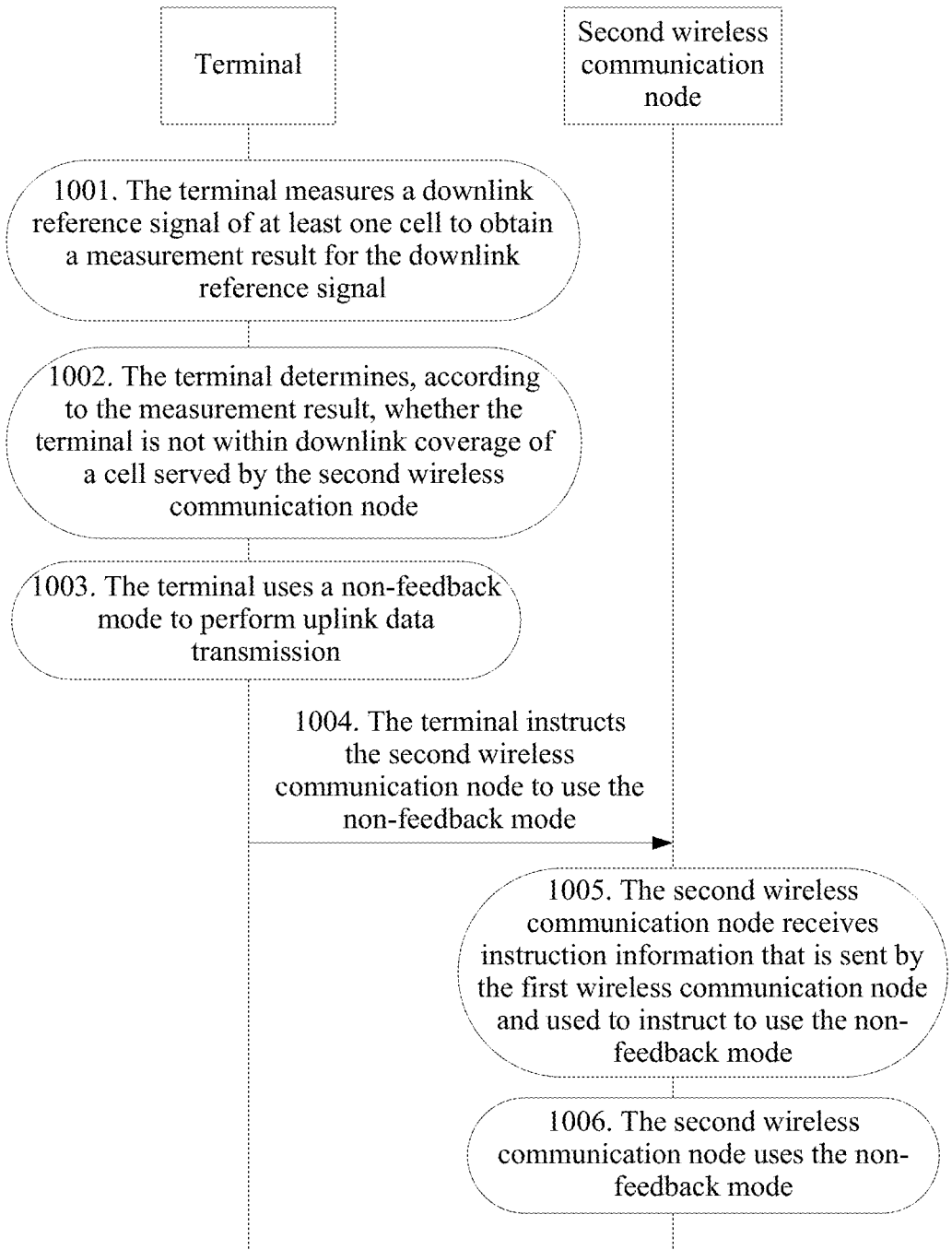
FIG. 10 is a schematic interaction diagram of another method for uplink data transmission according to an embodiment of the present invention.

Optionally, as shown in FIG. 10, the method includes the following steps:

1001. A terminal measures a downlink reference signal of at least one cell to obtain a measurement result of the downlink reference signal.

1002. The terminal determines, according to the measurement result, whether the terminal is not within downlink coverage of a cell served by a second wireless communication node.

Specifically, when the measurement report includes an identifier of the at least one cell, if the identifier of the at least one cell does not include an identifier of the cell served by the second wireless communication node, the terminal determines that the terminal is not within the downlink coverage of the second wireless communication node.

Optionally, when the measurement report includes a measurement result of a downlink reference signal of the cell served by the second wireless communication node, the second wireless communication node determines whether the measurement result of the downlink reference signal of the cell served by the second wireless communication node is less than or equal to a predetermined threshold, and if yes, the terminal determines that the terminal is not within the coverage of the second wireless communication node.

When the terminal determines, according to the measurement result, that the terminal is not within the downlink coverage of the cell served by the second wireless communication node, step 1003 is performed.

1003. The terminal uses a non-feedback mode to perform uplink data transmission.

The terminal may perform or not perform step 1004. When step 1004 is performed, network resources between the second wireless communication node and the terminal may be saved.

1004. The terminal instructs the second wireless communication node to use the non-feedback mode.

1005. The second wireless communication node receives instruction information that is sent by the first wireless communication node and used to instruct to use the non-feedback mode.

1006. The second wireless communication node uses the non-feedback mode.

Figure 11:
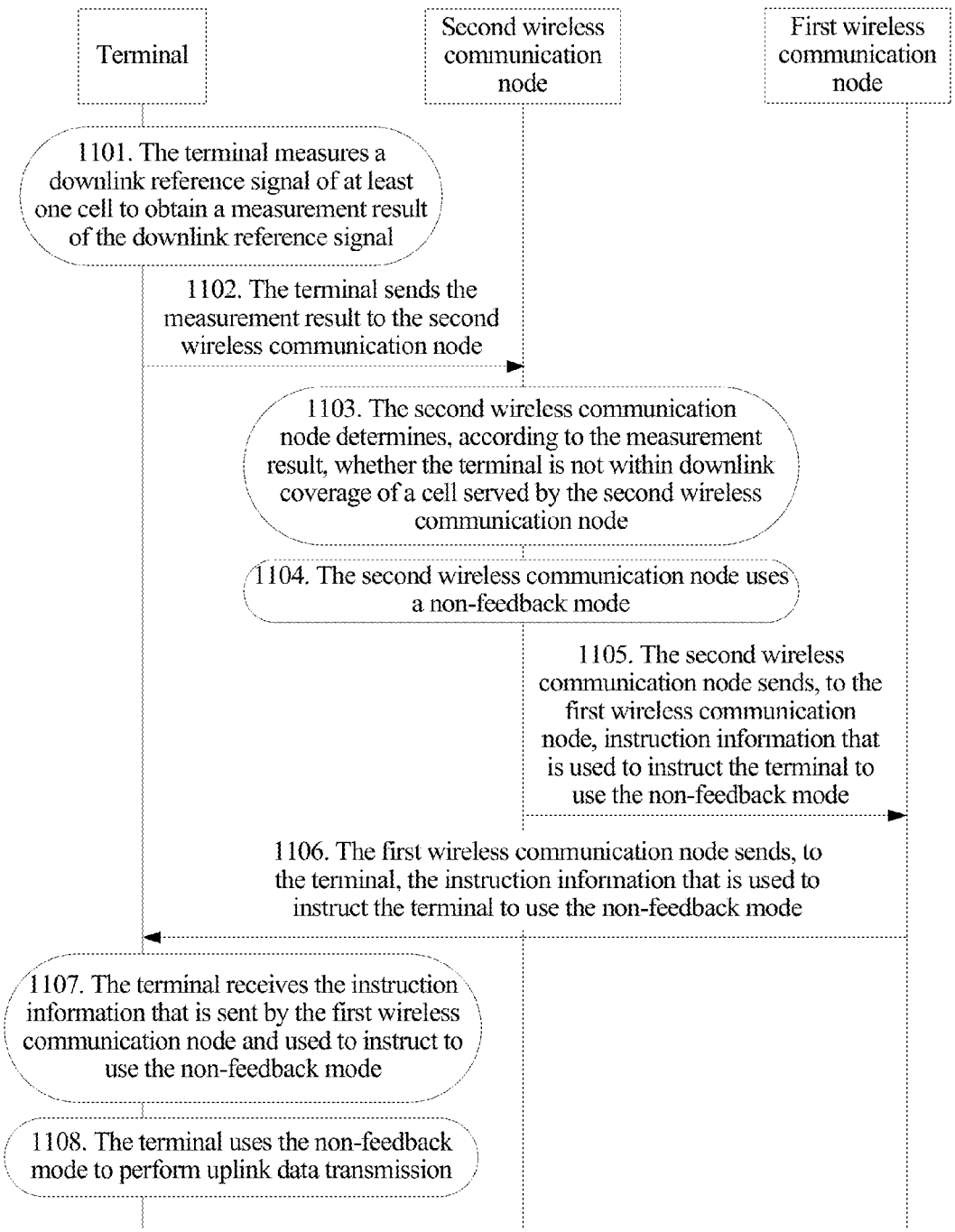
FIG. 11 is a schematic interaction diagram of still another method for uplink data transmission according to an embodiment of the present invention.

Optionally, as shown in FIG. 11, the method includes the following steps:

1101. A terminal measures a downlink reference signal of at least one cell to obtain a measurement result of the downlink reference signal.

1102. The terminal sends the measurement result to the second wireless communication node.

1103. The second wireless communication node determines, according to the measurement result, whether the terminal is not within downlink coverage of a cell served by the second wireless communication node.

Specifically, when the measurement report includes an identifier of the at least one cell, if the identifier of the at least one cell does not include an identifier of the cell served by the second wireless communication node, the second wireless communication node determines that the terminal is not within the downlink coverage of the second wireless communication node.

Optionally, when the measurement report includes a measurement result of a downlink reference signal of the cell served by the second wireless communication node, the second wireless communication node determines whether the measurement result of the downlink reference signal of the cell served by the second wireless communication node is less than or equal to a predetermined threshold, and if yes, the second wireless communication node determines that the terminal is not within the coverage of the second wireless communication node.

When the second wireless communication node determines, according to the measurement result, that the terminal is not within the downlink coverage of the cell served by the second wireless communication node, steps 1104 to 1108 are performed.

1104. The second wireless communication node uses a non-feedback mode.

1105. The second wireless communication node sends, to the first wireless communication node, instruction information that is used to instruct the terminal to use the non-feedback mode.

It should be noted that there is no time sequence limitation for step 1104 and step 1105.

1106. The first wireless communication node sends, to the terminal, the instruction information that is used to instruct the terminal to use the non-feedback mode.

1107. The terminal receives the instruction information that is sent by the first wireless communication node and used to instruct to use the non-feedback mode.

1108. The terminal uses the non-feedback mode to perform uplink data transmission.

This embodiment of the present invention provides a method for uplink data transmission. A first wireless communication node determines whether a terminal is within downlink coverage of a second wireless communication node; and when the first wireless communication node determines that the terminal is not within the downlink coverage of the second wireless communication node, the first wireless communication node instructs the terminal to use a non-feedback mode; and/or the first wireless communication node instructs the second wireless communication node to use a non-feedback mode.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 6

Figure 12:
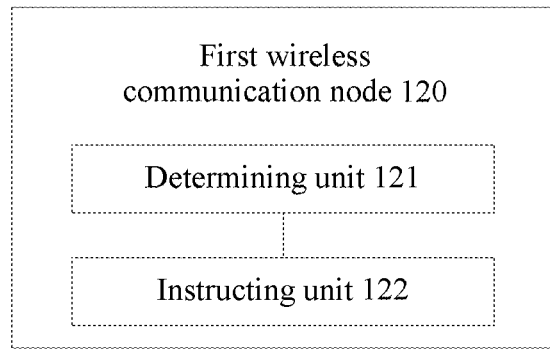
FIG. 12 is a schematic structural diagram of a first wireless communication node according to an embodiment of the present invention.

This embodiment of the present invention provides a wireless communication node. As shown in FIG. 12, the wireless communication node is a first wireless communication node 120, and the first wireless communication node 120 includes a determining unit 121 and an instructing unit 122.

The determining unit 121 is configured to determine whether a terminal is within downlink coverage of a second wireless communication node.

The instructing unit 122 is configured to: when the determining unit 121 determines that the terminal is not within the downlink coverage of the second wireless communication node, instruct the terminal to use a non-feedback mode; and/or instruct the second wireless communication node to use a non-feedback mode.

The first wireless communication node is a downlink serving node of the terminal, and the second wireless communication node is an uplink serving node of the terminal.

Further, the determining unit 121 is specifically configured to:
  receive a measurement report of the terminal for a downlink reference signal of at least one cell, where the measurement report includes an identifier of the at least one cell;
  determine whether the identifier of the at least one cell includes an identifier of a cell served by the second wireless communication node; and
  if the identifier of the at least one cell does not include the identifier of the cell served by the second wireless communication node, determine that the terminal is not within the downlink coverage of the second wireless communication node.

Further, the determining unit 121 is specifically configured to:
  receive a measurement report of the terminal for a downlink reference signal of a cell served by the second wireless communication node, where the measurement report includes a reference signal measurement result of the downlink reference signal of the cell served by the second wireless communication node; and
  if the reference signal measurement result of the downlink reference signal is not greater than a preset threshold, determine that the terminal is not within the downlink coverage of the second wireless communication node.

This embodiment of the present invention provides a wireless communication node. The determining unit determines whether a terminal is within downlink coverage of a second wireless communication node; and when the determining unit determines that the terminal is not within the downlink coverage of the second wireless communication node, the instructing unit instructs the terminal to use a non-feedback mode; and/or the first wireless communication node instructs the second wireless communication node to use a non-feedback mode.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 7

Figure 13:
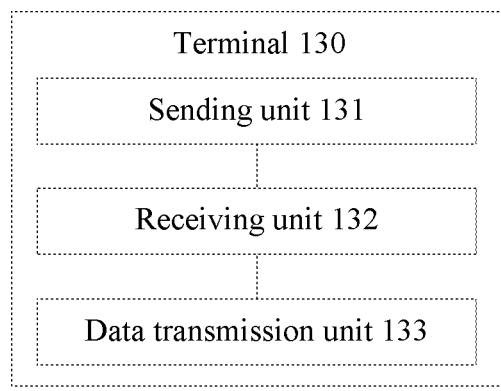
FIG. 13 is a schematic structural diagram of a terminal according to an embodiment of the present invention.

This embodiment of the present invention provides a terminal. As shown in FIG. 13, the terminal 130 includes a sending unit 131, a receiving unit 132, and a data transmission unit 133.

The sending unit 131 is configured to send a measurement report of a downlink reference signal of at least one cell to a first wireless communication node.

The receiving unit 132 is configured to: when the measurement report sent by the sending unit 131 includes an identifier of the at least one cell, and the identifier of the at least one cell does not include an identifier of a cell served by a second wireless communication node, receive instruction information that is sent by the first wireless communication node and used to instruct to use a non-feedback mode; or when the measurement report sent by the sending unit 131 includes a measurement result of a downlink reference signal of a cell served by the second wireless communication node, and the measurement result of the downlink reference signal of the cell served by the second wireless communication node is not greater than a preset threshold, receive instruction information that is sent by the first wireless communication node and used to instruct to use a non-feedback mode.

The data transmission unit 133 is configured to use the non-feedback mode to perform uplink data transmission.

The first wireless communication node is a downlink serving node of the terminal, and the second wireless communication node is an uplink serving node of the terminal.

The present invention provides a terminal. The sending unit sends a measurement report of a downlink reference signal of at least one cell to a first wireless communication node; when the measurement report includes an identifier of the at least one cell, and the identifier of the at least one cell does not include an identifier of a cell served by a second wireless communication node, the receiving unit receives instruction information that is sent by the first wireless communication node and used to instruct to use a non-feedback mode; or when the measurement report includes a measurement result of a downlink reference signal of a cell served by the second wireless communication node, and the measurement result of the downlink reference signal of the cell served by the second wireless communication node is not greater than a preset threshold, the receiving unit receives instruction information that is sent by the first wireless communication node and used to instruct to use a non-feedback mode; and the data transmission unit uses the non-feedback mode to perform uplink data transmission.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 8

Figure 14:
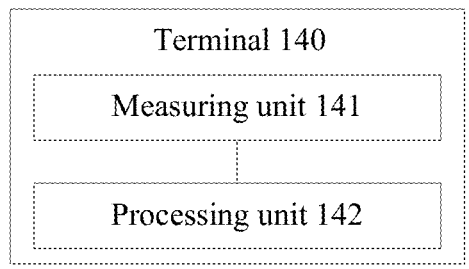
FIG. 14 is a schematic structural diagram of another terminal according to an embodiment of the present invention.

This embodiment of the present invention provides a terminal. As shown in FIG. 14, the terminal 140 includes a measuring unit 141 and a processing unit 142.

The measuring unit 141 is configured to measure a downlink reference signal of at least one cell to obtain a measurement result of the downlink reference signal.

The processing unit 142 is configured to: when the terminal determines, according to the measurement result obtained by the measuring unit 141, that the terminal is not within downlink coverage of a cell served by a second wireless communication node, use a non-feedback mode to perform uplink data transmission, and instruct the second wireless communication node to use the non-feedback mode, where the second wireless communication node is an uplink serving node of the terminal.

Figure 15:
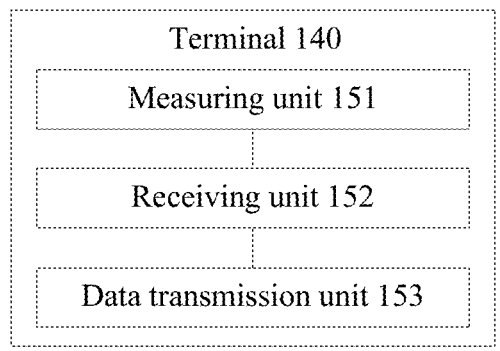
FIG. 15 is a schematic structural diagram of still another terminal according to an embodiment of the present invention.

Alternatively, as shown in FIG. 15, the terminal 140 includes a measuring unit 151, a receiving unit 152, and a data transmission unit 153.

The measuring unit 151 is configured to measure a downlink reference signal of at least one cell to obtain a measurement result of the downlink reference signal.

The receiving unit 152 is configured to: when the terminal sends the measurement result obtained by the measuring unit 151 to the second wireless communication node, if the second wireless communication node determines, according to the measurement result, that the terminal is not within downlink coverage of a cell served by the second wireless communication node, receive instruction information that is forwarded by the second wireless communication node by using a first wireless communication node and used to instruct to use a non-feedback mode.

The data transmission unit 153 is configured to use, according to the instruction information received by the receiving unit 152, the non-feedback mode to perform uplink data transmission.

The first wireless communication node is a downlink serving node of the terminal, and the second wireless communication node is an uplink serving node of the terminal.

This embodiment of the present invention provides a terminal. The measuring unit measures a downlink reference signal of at least one cell to obtain a measurement result of the downlink reference signal; and when the processor determines, according to the measurement result, that the terminal is not within downlink coverage of a cell served by a second wireless communication node, the processing unit uses a non-feedback mode to perform uplink data transmission, and instructs the second wireless communication node to use the non-feedback mode. Alternatively, the measuring unit measures a downlink reference signal of at least one cell to obtain a measurement result of the downlink reference signal; when the terminal sends the measurement result to the second wireless communication node, if the second wireless communication node determines, according to the measurement result, that the terminal is not within downlink coverage of a cell served by the second wireless communication node, the receiving unit receives instruction information that is forwarded by the second wireless communication node by using a first wireless communication node and used to instruct to use a non-feedback mode; and the data transmission unit uses, according to the instruction information, the non-feedback mode to perform uplink data transmission, where the first wireless communication node is a downlink serving node of the terminal, and the second wireless communication node is an uplink serving node of the terminal.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 9

Figure 16:
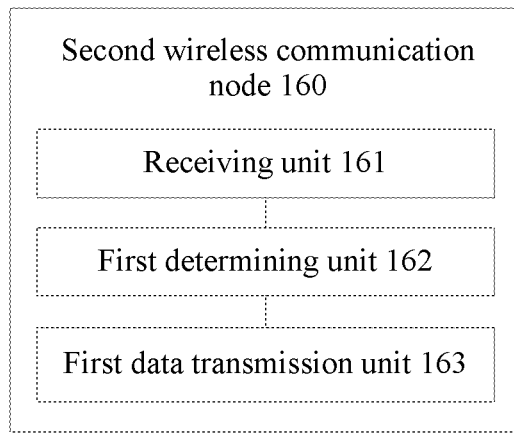
FIG. 16 is a schematic structural diagram of a second wireless communication node according to an embodiment of the present invention.

This embodiment of the present invention provides a wireless communication node. As shown in FIG. 16, the wireless communication node is a second wireless communication node 160, and the second wireless communication node 160 includes a receiving unit 161, a first determining unit 162, and a first data transmission unit 163.

The receiving unit 161 is configured to receive a measurement report that is sent by a terminal and that is for at least one cell.

The first determining unit 162 is configured to: when the measurement report received by the receiving unit 161 includes an identifier of the at least one cell, if the identifier of the at least one cell does not include an identifier of a cell served by the second wireless communication node, determine that the terminal is not within downlink coverage of the second wireless communication node.

The first data transmission unit 163 is configured to: when the first determining unit 162 determines that the terminal is not within the downlink coverage of the second wireless communication node, use a non-feedback mode, and instruct the terminal to use the non-feedback mode to perform uplink data transmission, where the second wireless communication node is a downlink serving node of the terminal.

Figure 17:
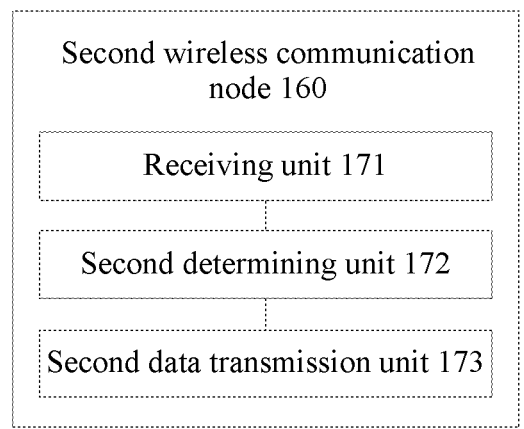
FIG. 17 is a schematic structural diagram of another second wireless communication node according to an embodiment of the present invention.

Alternatively, as shown in FIG. 17, the second wireless communication node 160 includes a receiving unit 171, a second determining unit 172, and a second data transmission unit 173.

The receiving unit 171 is configured to receive a measurement report that is sent by a terminal and that is for at least one cell.

The second determining unit 172 is configured to: when the measurement report received by the receiving unit 171 includes a measurement result of a downlink reference signal of a cell served by the second wireless communication node, determine whether the measurement result of the downlink reference signal of the cell served by the second wireless communication node is less than or equal to a predetermined threshold, and if yes, determine, by the second wireless communication node, that the terminal is not within coverage of the second wireless communication node.

The second data transmission unit 173 is configured to: when the second determining unit 172 determines that the terminal is not within the coverage of the second wireless communication node, use a non-feedback mode, and instruct the terminal to use the non-feedback mode to perform uplink data transmission.

This embodiment of the present invention provides a second wireless communication node. The receiving unit receives a measurement report that is sent by a terminal and that is for at least one cell; when the measurement report includes an identifier of the at least one cell, if the identifier of the at least one cell does not include an identifier of a cell served by the second wireless communication node, the first determining unit determines that the terminal is not within downlink coverage of the second wireless communication node; and the first data transmission unit uses a non-feedback mode, and instructs the terminal to use the non-feedback mode to perform uplink data transmission. Alternatively, the receiving unit receives a measurement report that is sent by a terminal and that is for at least one cell; when the measurement report includes a measurement result of a downlink reference signal of a cell served by the second wireless communication node, the second determining unit determines whether the measurement result of the downlink reference signal of the cell served by the second wireless communication node is less than or equal to a predetermined threshold, and if yes, the second determining unit determines that the terminal is not within coverage of the second wireless communication node; and the second data transmission unit uses a non-feedback mode, and instructs the terminal to use the non-feedback mode to perform uplink data transmission.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 10

Figure 18:
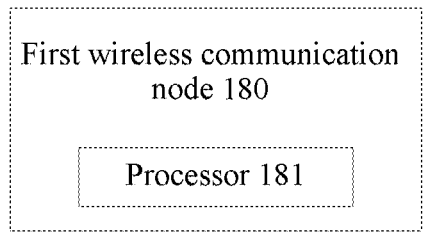
FIG. 18 is a schematic structural diagram of another first wireless communication node according to an embodiment of the present invention.

This embodiment of the present invention provides a wireless communication node. As shown in FIG. 18, the wireless communication node is a first wireless communication node 180, and the first wireless communication node 180 includes a processor 181.

The processor 181 is configured to determine whether a terminal is within downlink coverage of a second wireless communication node.

The processor 181 is further configured to: when determining that the terminal is not within the downlink coverage of the second wireless communication node, instruct the terminal to use a non-feedback mode; and/or instruct the second wireless communication node to use a non-feedback mode.

The first wireless communication node is a downlink serving node of the terminal, and the second wireless communication node is an uplink serving node of the terminal.

Further, the processor 181 is specifically configured to:
  receive a measurement report of the terminal for a downlink reference signal of at least one cell, where the measurement report includes an identifier of the at least one cell;

determine whether the identifier of the at least one cell includes an identifier of a cell served by the second wireless communication node; and if the identifier of the at least one cell does not include the identifier of the cell served by the second wireless communication node, determine that the terminal is not within the downlink coverage of the second wireless communication node.

Further, the processor 181 is specifically configured to:

receive a measurement report of the terminal for a downlink reference signal of a cell served by the second wireless communication node, where the measurement report includes a reference signal measurement result of the downlink reference signal of the cell served by the second wireless communication node; and if the reference signal measurement result of the downlink reference signal is not greater than a preset threshold, determine that the terminal is not within the downlink coverage of the second wireless communication node.

This embodiment of the present invention provides a wireless communication node. The processor determines whether a terminal is within downlink coverage of a second wireless communication node; and when determining that the terminal is not within the downlink coverage of the second wireless communication node, the processor instructs the terminal to use a non-feedback mode; and/or the first wireless communication node instructs the second wireless communication node to use a non-feedback mode.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 11

Figure 19:
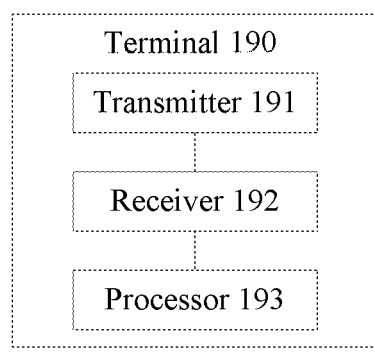
FIG. 19 is a schematic structural diagram of yet another terminal according to an embodiment of the present invention.

This embodiment of the present invention provides a terminal. As shown in FIG. 19, the terminal 190 includes a transmitter 191, a receiver 192, and a processor 193.

The transmitter 191 is configured to send a measurement report of a downlink reference signal of at least one cell to a first wireless communication node.

The receiver 192 is configured to: when the measurement report sent by the transmitter 191 includes an identifier of the at least one cell, and the identifier of the at least one cell does not include an identifier of a cell served by a second wireless communication node, receive instruction information that is sent by the first wireless communication node and used to instruct to use a non-feedback mode; or when the measurement report sent by the transmitter 191 includes a measurement result of a downlink reference signal of a cell served by the second wireless communication node, and the measurement result of the downlink reference signal of the cell served by the second wireless communication node is not greater than a preset threshold, receive instruction information that is sent by the first wireless communication node and used to instruct to use a non-feedback mode.

The processor 193 is configured to use the non-feedback mode to perform uplink data transmission.

The first wireless communication node is a downlink serving node of the terminal, and the second wireless communication node is an uplink serving node of the terminal.

The present invention provides a terminal. The transmitter sends a measurement report of a downlink reference signal of at least one cell to a first wireless communication node; when the measurement report includes an identifier of the at least one cell, and the identifier of the at least one cell does not include an identifier of a cell served by a second wireless communication node, the receiver receives instruction information that is sent by the first wireless communication node and used to instruct to use a non-feedback mode; or when the measurement report includes a measurement result of a downlink reference signal of a cell served by the second wireless communication node, and the measurement result of the downlink reference signal of the cell served by the second wireless communication node is not greater than a preset threshold, the receiver receives instruction information that is sent by the first wireless communication node and used to instruct to use a non-feedback mode; and the processor uses the non-feedback mode to perform uplink data transmission.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 12

Figure 20:
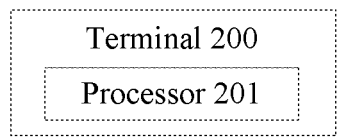
FIG. 20 is a schematic structural diagram of still yet another terminal according to an embodiment of the present invention.

This embodiment of the present invention provides a terminal. As shown in FIG. 20, the terminal 200 includes a processor 201.

The processor 201 is configured to measure a downlink reference signal of at least one cell to obtain a measurement result of the downlink reference signal.

The processor 201 is further configured to: when the terminal determines, according to the measurement result, that the terminal is not within downlink coverage of a cell served by a second wireless communication node, use a non-feedback mode to perform uplink data transmission, and instruct the second wireless communication node to use the non-feedback mode, where the second wireless communication node is an uplink serving node of the terminal.

Figure 21:
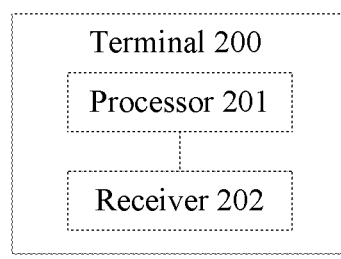
FIG. 21 is a schematic structural diagram of a further terminal according to an embodiment of the present invention.

Alternatively, as shown in FIG. 21, the terminal 200 includes a processor 201 and a receiver 202.

The processor 201 is configured to measure a downlink reference signal of at least one cell to obtain a measurement result of the downlink reference signal.

The receiver 202 is configured to: when the terminal sends the measurement result obtained by the processor 203 to the second wireless communication node, if the second wireless communication node determines, according to the measurement result, that the terminal is not within downlink coverage of a cell served by the second wireless communication node, receive instruction information that is forwarded by the second wireless communication node by using a first wireless communication node and used to instruct to use a non-feedback mode.

The processor 201 is further configured to use, according to the instruction information received by the receiver 202, the non-feedback mode to perform uplink data transmission.

The first wireless communication node is a downlink serving node of the terminal, and the second wireless communication node is an uplink serving node of the terminal.

This embodiment of the present invention provides a terminal. The processor measures a downlink reference signal of at least one cell to obtain a measurement result of the downlink reference signal; and when the processor determines, according to the measurement result, that the terminal is not within downlink coverage of a cell served by a second wireless communication node, the processor uses a non-feedback mode to perform uplink data transmission, and instructs the second wireless communication node to use the non-feedback mode. Alternatively, the processor measures a downlink reference signal of at least one cell to obtain a measurement result of the downlink reference signal; when the terminal sends the measurement result to the second wireless communication node, if the second wireless communication node determines, according to the measurement result, that the terminal is not within downlink coverage of a cell served by the second wireless communication node, the receiver receives instruction information that is forwarded by the second wireless communication node by using a first wireless communication node and used to instruct to use a non-feedback mode; and the processor uses, according to the instruction information, the non-feedback mode to perform uplink data transmission, where the first wireless communication node is a downlink serving node of the terminal, and the second wireless communication node is an uplink serving node of the terminal.

According to the solution, when a terminal is not within downlink coverage of a second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

Embodiment 13

Figure 22:
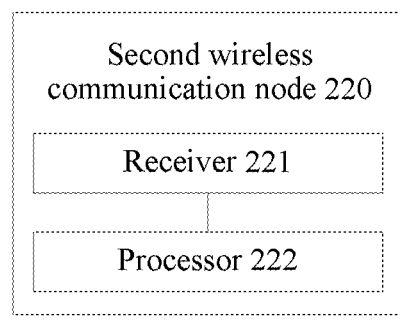
FIG. 22 is a schematic structural diagram of still another second wireless communication node according to an embodiment of the present invention.

This embodiment of the present invention provides a wireless communication node. As shown in FIG. 22, the wireless communication node is a second wireless communication node, and the second wireless communication node 220 includes a receiver 221 and a processor 222.

The receiver 221 is configured to receive a measurement report that is sent by a terminal and that is for at least one cell.

The processor 222 is configured to: when the measurement report received by the receiver 221 includes an identifier of the at least one cell, if the identifier of the at least one cell does not include an identifier of a cell served by the second wireless communication node, determine that the terminal is not within downlink coverage of the second wireless communication node.

The processor 222 is further configured to: when determining that the terminal is not within the downlink coverage of the second wireless communication node, use a non-feedback mode, and instruct the terminal to use the non-feedback mode to perform uplink data transmission, where the second wireless communication node is a downlink serving node of the terminal.

In another case, the receiver 221 is configured to receive a measurement report for that is sent by a terminal and that is for at least one cell.

The processor 222 is configured to: when the measurement report received by the receiver 221 includes a measurement result of a downlink reference signal of a cell served by the second wireless communication node, determine whether the measurement result of the downlink reference signal of the cell served by the second wireless communication node is less than or equal to a predetermined threshold, and if yes, determine, by the second wireless communication node, that the terminal is not within coverage of the second wireless communication node.

The processor 222 is further configured to: when determining that the terminal is not within the coverage of the second wireless communication node, use a non-feedback mode, and instruct the terminal to use the non-feedback mode to perform uplink data transmission.

This embodiment of the present invention provides a second wireless communication node. The receiver receives a measurement report that is sent by a terminal and that is for at least one cell; when the measurement report includes an identifier of the at least one cell, if the identifier of the at least one cell does not include an identifier of a cell served by the second wireless communication node, the processor determines that the terminal is not within downlink coverage of the second wireless communication node; and the processor uses a non-feedback mode, and instructs the terminal to use the non-feedback mode to perform uplink data transmission. Alternatively, the receiver receives a measurement report that is sent by a terminal and that is for at least one cell; when the measurement report includes a measurement result of a downlink reference signal of a cell served by the second wireless communication node, the processor determines whether the measurement result of the downlink reference signal of the cell served by the second wireless communication node is less than or equal to a predetermined threshold, and if yes, the processor determines that the terminal is not within coverage of the second wireless communication node; and the second wireless communication node uses a non-feedback mode, and instructs the terminal to use the non-feedback mode to perform uplink data transmission.

According to the solution, when a terminal is not within downlink coverage of the second wireless communication node, the terminal may use a non-feedback mode, and further, the terminal does not retransmit, to the second wireless communication node, uplink data that has been sent; or the second wireless communication node uses a non-feedback mode, and further, the second wireless communication node does not receive, on a time-frequency resource allocated to the terminal, uplink data retransmitted by the terminal, which further ensures that a HARQ mechanism between the terminal and the second wireless communication node works normally.

In each embodiment of the present invention, if a terminal is not within downlink coverage of a second wireless communication node, the terminal uses a non-feedback mode to perform uplink data transmission, and the terminal does not consider any longer whether the second wireless communication node receives uplink data correctly; or the second wireless communication node uses a non-feedback mode to receive uplink data, and because the terminal receives, by directly using the second wireless communication node, HARQ feedback information sent by the second wireless communication node, the second wireless communication node may not send the HARQ feedback information to the terminal any longer regardless of whether the uplink data is received correctly. When the terminal moves to downlink coverage of a wireless communication node, uplink data transmission may be performed between the terminal and the wireless communication node according to an existing HARQ feedback mechanism. Therefore, the following problem may be avoided: A forward delay of HARQ feedback information is caused by a non-ideal backhaul link between a first wireless communication node and the second wireless communication node, and consequently, a resource conflict occurs because a time-frequency resource that is used when the terminal retransmits the uplink data to the second wireless communication node is scheduled by the second wireless communication node for another terminal.

It may be clearly understood by a person skilled in the art that, for the purpose of convenient and brief description, division of the foregoing functional modules is used as an example for illustration. In an actual application, the foregoing functions can be allocated to different functional modules and implemented according to a requirement, that is, an internal structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for uplink data transmission in a wireless communication system including a first wireless communication node and a second wireless communication node both serve a terminal, wherein the first wireless communication node is a downlink serving node of the terminal, and the second wireless communication node is an uplink serving node of the terminal, the method comprising:
    determining, by the first wireless communication node, whether the terminal is within downlink coverage of the second wireless communication node; and
    when the first wireless communication node determines that the terminal is not within the downlink coverage of the second wireless communication node:
        instructing, by the first wireless communication node, the terminal to use a non-feedback mode in which the terminal does not retransmit to the second wireless communication node, uplink data that has been sent; and/or
        instructing, by the first wireless communication node, the second wireless communication node to use a non-feedback mode in which the second wireless communication node does not receive, on a time-frequency resource allocated to the terminal, uplink data retransmitted from the terminal,
    wherein the determining, by the first wireless communication node, whether the terminal is within downlink coverage of the second wireless communication node comprises:
    receiving, by the first wireless communication node, a measurement report of the terminal for a downlink reference signal of at least one cell, wherein the measurement report comprises an identifier of the at least one cell;
    determining, by the first wireless communication node, whether the identifier of the at least one cell comprises an identifier of a cell served by the second wireless communication node; and
    if the identifier of the at least one cell does not comprise the identifier of the cell served by the second wireless communication node, determining, by the first wireless communication node, that the terminal is not within the downlink coverage of the second wireless communication node.

2. The method according to claim 1, wherein the determining, by the first wireless communication node, whether the terminal is within downlink coverage of the second wireless communication node comprises:
    receiving, by the first wireless communication node, a measurement report of the terminal for a downlink reference signal of a cell served by the second wireless communication node, wherein the measurement report comprises a reference signal measurement result of the downlink reference signal of the cell served by the second wireless communication node;

determining, by the first wireless communication node, whether the reference signal measurement result of the downlink reference signal is greater than a preset threshold; and if the reference signal measurement result of the downlink reference signal is not greater than the preset threshold, determining, by the first wireless communication node, that the terminal is not within the downlink coverage of the second wireless communication node.

3. A wireless communication node in a wireless communication system including a first wireless communication node and a second wireless communication node both serve a terminal, wherein the wireless communication node is the first wireless communication node that is a downlink serving node of the terminal, and the second wireless communication node is an uplink serving node of the terminal, wherein the wireless communication node comprises:

a processor configured to determine whether the terminal is within downlink coverage of the second wireless communication node; and a transmitter coupled to the processor and configured to: when the processor determines that the terminal is not within the downlink coverage of the second wireless communication node, transmit a message instructing the terminal to use a non-feedback mode in which the terminal does not retransmit to the second wireless communication node, uplink data that has been sent; and/or transmit a message instructing the second wireless communication node to use a non-feedback mode in which the second wireless communication node does not receive, on a time-frequency resource allocated to the terminal, uplink data retransmitted from the terminal, wherein the processor is further configured to:

receive a measurement report of the terminal for a downlink reference signal of a cell served by the second wireless communication node, wherein the measurement report comprises a reference signal measurement result of the downlink reference signal of the cell served by the second wireless communication node; and if the reference signal measurement result of the downlink reference signal is not greater than a preset threshold, determine that the terminal is not within the downlink coverage of the second wireless communication node.

4. The wireless communication node according to claim 3, wherein the processor is configured to:

receive a measurement report of the terminal for a downlink reference signal of at least one cell, wherein the measurement report comprises an identifier of the at least one cell;

determine whether the identifier of the at least one cell comprises an identifier of a cell served by the second wireless communication node; and if the identifier of the at least one cell does not comprise the identifier of the cell served by the second wireless communication node, determine that the terminal is not within the downlink coverage of the second wireless communication node.

5. A terminal served by a first wireless communication node which is a downlink serving node of the terminal and a second wireless communication node which is an uplink serving node of the terminal, wherein the terminal comprises:

a processor; and a transmitter, wherein the processor is configured to determine use a non-feedback mode in which the terminal does not retransmit to the second wireless communication node uplink data that has been sent, when the terminal is not within the downlink coverage of the second wireless communication node; and the transmitter is configured to transmit uplink data to the second wireless communication node in the non-feedback mode, wherein the transmitter is further configured to transmit a measurement report for a downlink reference signal of at least one cell to the first wireless communication node, wherein the measurement report is used to determine whether the terminal is within the downlink coverage of the second wireless communication node, wherein the terminal further comprises a receiver configured to: receive instruction information used to instruct the terminal to use the non-feedback mode from the first wireless communication node when the first wireless communication node determines the terminal is not within the downlink coverage of the second wireless communication node based on that the measurement report does not comprise an identifier of a cell served by the second wireless communication node;

wherein the processor is configured to determine to use the non-feedback mode when the receiver receives the instruction information.

6. The terminal according to claim 5, wherein the terminal further comprises a receiver configured to: receive instruction information used to instruct the terminal to use the non-feedback mode from the first wireless communication node when the first wireless communication node determines the terminal is not within the downlink coverage of the second wireless communication node based on that the measurement report comprises a measurement result of a downlink reference signal of a cell served by the second wireless communication node, and the measurement result of the downlink reference signal of the cell served by the second wireless communication node is not greater than a preset threshold;

wherein the processor is configured to determine to use the non-feedback mode when the receiver receives the instruction information.

7. The terminal according to claim 5, wherein the processor is configured to determine to use the non-feedback mode when the processor determines the terminal is not within the downlink coverage of the second wireless communication node according to a measurement report for a downlink reference signal of at least one cell.

8. The terminal according to claim 5, wherein the transmitter is further configured to transmit a message instructing the second wireless communication node to use a non-feedback mode in which the second wireless communication node does not receive, on the time-frequency resource allocated to the terminal, uplink data retransmitted from the terminal.

9. The terminal according to claim 5, wherein the transmitter is further configured to transmit a measurement report for a downlink reference signal of at least one cell to the second wireless communication node, wherein the measurement report is used to determine whether the terminal is within the downlink coverage of the second wireless communication node.

10. The terminal according to claim 9, wherein the terminal further comprises a receiver configured to receive instruction information sent by the second wireless communication node through the first wireless communication node, wherein the instruction information is used to instruct the terminal to use the non-feedback mode, when the second wireless communication node determines, according to the measurement result, that the terminal is not within downlink coverage of a cell served by the second wireless communication node.

11. The terminal according to claim 5,
wherein the processor is further configured to discard a feedback message from the second wireless communication node when the terminal uses the non-feedback mode, the feedback message indicating the second wireless communication node has or has not received the uplink data from the terminal.

* * * * *